(12) United States Patent
Toya et al.

(10) Patent No.: US 11,132,194 B2
(45) Date of Patent: Sep. 28, 2021

(54) ELECTRONIC CALCULATOR, METHOD, AND STORAGE MEDIUM

(71) Applicant: KABUSHIKI KAISHA TOSHIBA, Minato-ku (JP)

(72) Inventors: Hirotaka Toya, Yokohama (JP); Mamoru Aoki, Kawasaki (JP); Hiroshi Fujimoto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/351,973

(22) Filed: Mar. 13, 2019

(65) Prior Publication Data

US 2020/0183682 A1 Jun. 11, 2020

(30) Foreign Application Priority Data

Dec. 7, 2018 (JP) .............................. JP2018-229591

(51) Int. Cl.
| | |
|---|---|
| *G06F 8/75* | (2018.01) |
| *G06F 8/73* | (2018.01) |
| *G06F 8/51* | (2018.01) |
| *G06F 8/34* | (2018.01) |
| *G06F 8/35* | (2018.01) |
| *G06F 8/33* | (2018.01) |

(52) U.S. Cl.
CPC ................. *G06F 8/75* (2013.01); *G06F 8/33* (2013.01); *G06F 8/34* (2013.01); *G06F 8/35* (2013.01); *G06F 8/51* (2013.01); *G06F 8/73* (2013.01)

(58) Field of Classification Search
None
See application file for complete search history.

(56) References Cited

U.S. PATENT DOCUMENTS

| | | | |
|---|---|---|---|
| 6,792,595 B1* | 9/2004 | Storistenau | G06F 8/33 345/650 |
| 8,434,013 B2* | 4/2013 | Stevens | G06F 8/24 715/763 |
| 2004/0034846 A1* | 2/2004 | Ortal | G06F 8/24 717/111 |
| 2010/0235815 A1* | 9/2010 | Maybee | G06F 11/3636 717/125 |
| 2019/0294434 A1 | 9/2019 | Morita et al. | |

FOREIGN PATENT DOCUMENTS

JP 2019-168891 A 10/2019

OTHER PUBLICATIONS

Dimitri van Heesch, "Doxygen", 2011, 4 pages (with Machine Generated English Translation).
(Continued)

*Primary Examiner* — Lewis A Bullock, Jr.
*Assistant Examiner* — Mark A Gooray
(74) *Attorney, Agent, or Firm* — Oblon, McClelland, Maier & Neustadt, L.L.P.

(57) ABSTRACT

According to one embodiment, an electronic calculator includes a processor. The processor is configured to display a screen image on which a first area displaying a source code and a second area displaying a diagram representing at least a part of the source code are arranged and edit the diagram displayed in the second area.

15 Claims, 15 Drawing Sheets

(56) References Cited

OTHER PUBLICATIONS

Yuu Ohmura et al., "Design and Implementation of a Source Code Reading Helper Tool for Program Comprehension", Conference proceedings Japan Society for Software Science and Technology (31st), 2014, 10 pages (with Machine Generated English Translation).

Takahiro Shida et al., "Cool Eclipse Plugin (14): Lightweight UML Plugin AmaterasUML (2/4)", 12 pages (with Machine Generated English Translation).

Masaki Yamada, "[UML Tool Review] From Modeling Tool to Integrated Development Environment", 2003, 12 pages (with Machine Generated English Translation).

"Block (programming)", Free Encyclopedia "Wikipedia", 2018, 4 pages (with Machine Generated English Translation).

Hirotaka Toya, "Source code understanding support tool—proMETHEUS", 2018, 20 pages.

"proMETHEUS User Guide", 2018, 33 pages.

* cited by examiner

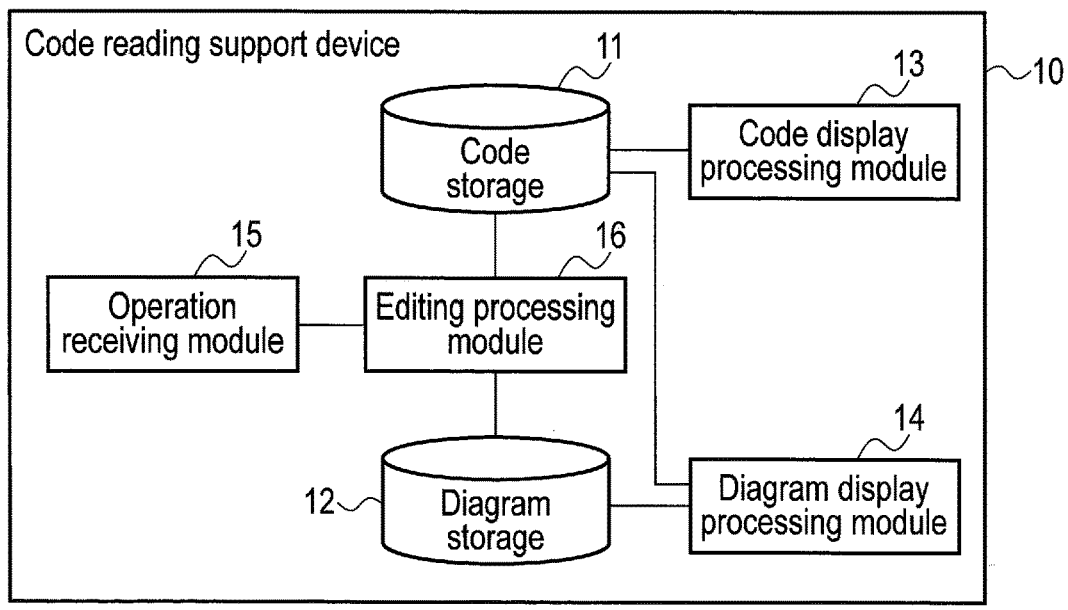
F I G. 1
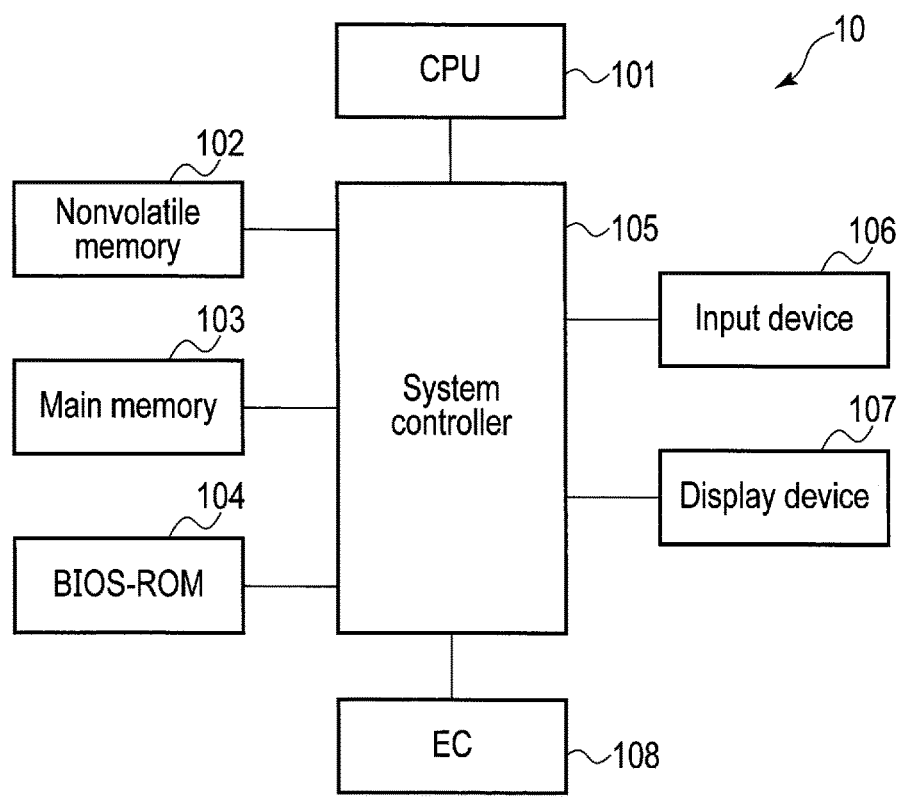
F I G. 2

| Source code ID | Function ID | Position information | |
|---|---|---|---|
| 1 | 1 | x1~x2 | ~111a |
| 1 | 2 | y1~y2 | ~111b |
| ... | ... | ... | |

F I G. 3

| Function ID | Code block ID | Position information | |
|---|---|---|---|
| 1 | 1 | x11~x12 | ~112a |
| 1 | 2 | x13~x14 | ~112b |
| ... | ... | ... | |

F I G. 4

| Source code ID | Additional content | Position information | |
|---|---|---|---|
| 1 | Highlight | x1~x2 | ~113a |
| 1 | Comment 1 | x15 | ~113b |
| ... | ... | ... | |

F I G. 5

| Diagram ID | Caller function ID | Callee function ID | |
|---|---|---|---|
| 1 | 1 | 2 | ~121a |
| 1 | 2 | 3 | ~121b |
| ... | ... | ... | |

F I G. 6

| Diagram ID | Additional content | Position information | |
|---|---|---|---|
| 1 | Highlight | Function ID "1" | ~122a |
| 1 | Comment 2 | Code block ID "1" | ~122b |
| ... | ... | ... | |

```
File  Edit  Source  Refactoring  Navigate  Search  Project  Execute  Window  Help
```

Project explorer

> File

```
17
18   static int flg=0;
19
20   #define PRINT_FUNC > (printf("%s called¥n", __FUNCTION__))
21
22   int toymodel_exec(TOY_MODE mode) {
23   >   int ret = 0;
24
25   >   printf("toymodel exec= %d¥n", mode);
26   >   switch (mode) {
27   >   >   case MODE1:
28   >   >   >   toy_call();
29   >   >   >   break;
30   >   >   case MODE2:
31   >   >   >   toy_tree();
32
```

FIG. 13

```
File  Edit  Source  Refactoring  Navigate  Search  Project  Execute  Window  Help
```

```
17
18    static int flg=0;
19
20    #define PRINT_FUNC > (printf("%s called\n", __FUNCTION__))
21
22 ⊖ int toymodel_exec(TOY_MODE mode) {
23    >    int ret = 0;
24    >
25    >    printf("toymodel exec= %d\n" mode);
26    >    switch (mode) {
27    >        case MODE1:
28    >    >        toy_call();
29    >    >        break;
30    >        case MODE2:
31    >    >        toy_tree();
32    >
```

FIG. 14

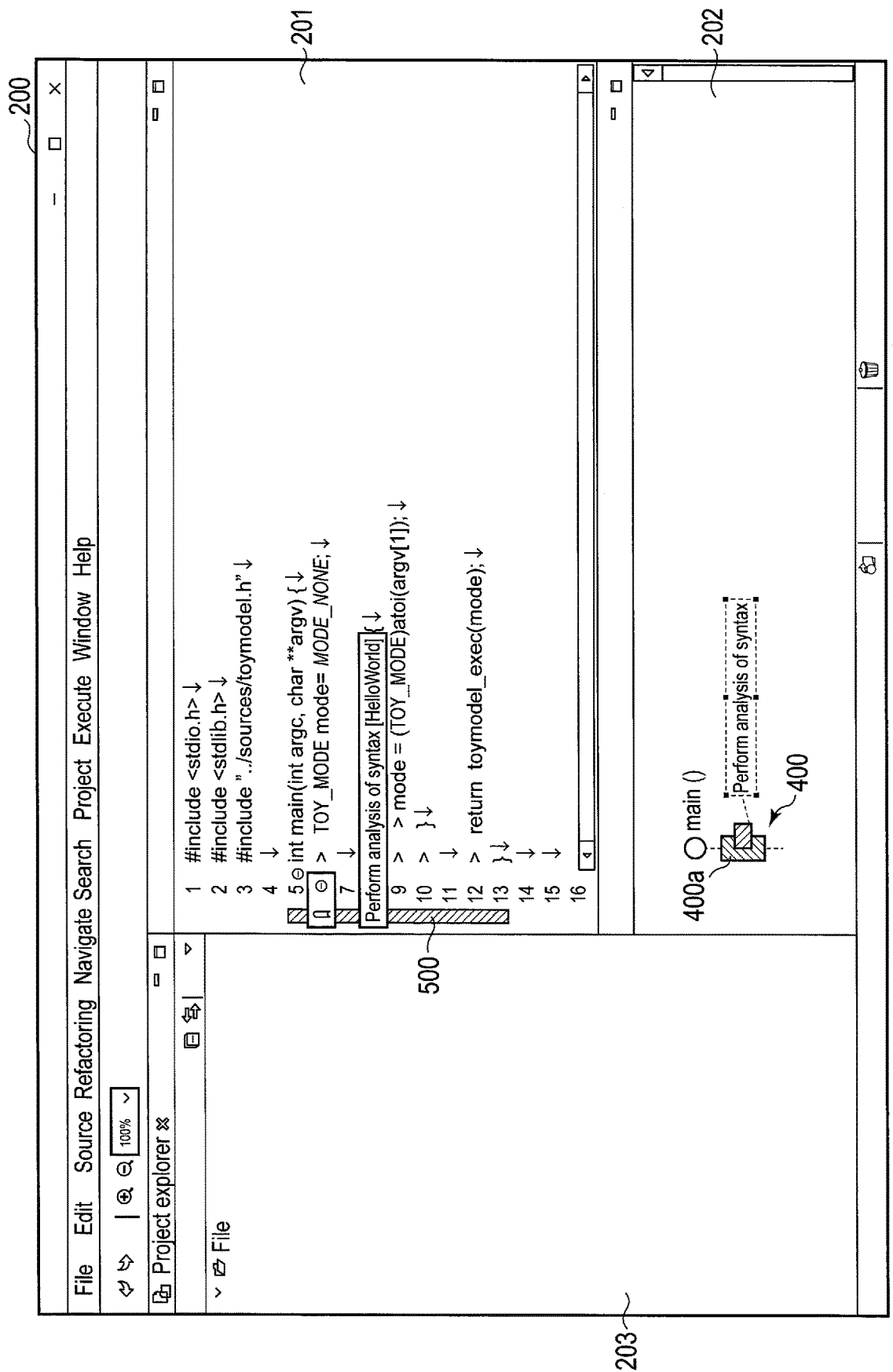
F I G. 19

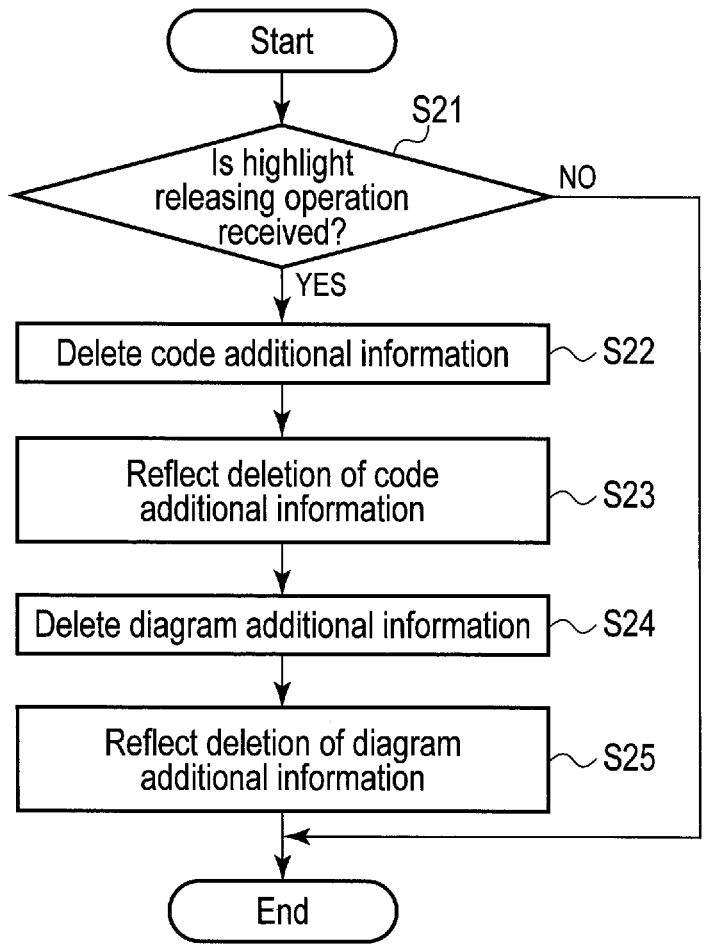
F I G. 20

ELECTRONIC CALCULATOR, METHOD, AND STORAGE MEDIUM

CROSS-REFERENCE TO RELATED APPLICATIONS

This application is based upon and claims the benefit of priority from Japanese Patent Application No. 2018-229591, filed Dec. 7, 2018, the entire contents of which are incorporated herein by reference.

FIELD

Embodiments described herein relate generally to an electronic calculator, a method, and a storage medium.

BACKGROUND

In general, it is necessary to understand contents of source codes written in a program language in order to operate and maintain software, which is referred to as a legacy code, for example, whose specification is unknown.

However, understanding the contents of enormous source codes (hereinafter referred to as code reading) is difficult, and is extremely time-consuming.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram illustrating an example of a functional configuration of a code reading support device according to an embodiment;

FIG. 2 is a diagram illustrating an example of a system configuration of the code reading support device;

FIG. 3 is a view illustrating an example of a data structure of function information included in code analysis information;

FIG. 4 is a view illustrating an example of a data structure of code block information included in the code analysis information;

FIG. 5 is a view illustrating an example of a data structure of code additional information;

FIG. 6 is a view illustrating an example of a data structure of diagram information;

FIG. 13 is a view for specifically describing the diagram display process;

FIG. 14 is a view for specifically describing the diagram display process;

FIG. 19 is a view for specifically describing the comment addition process;

FIG. 20 is a flowchart illustrating an example of a processing procedure of a highlight display change process.

DETAILED DESCRIPTION

Figures 7, 8:
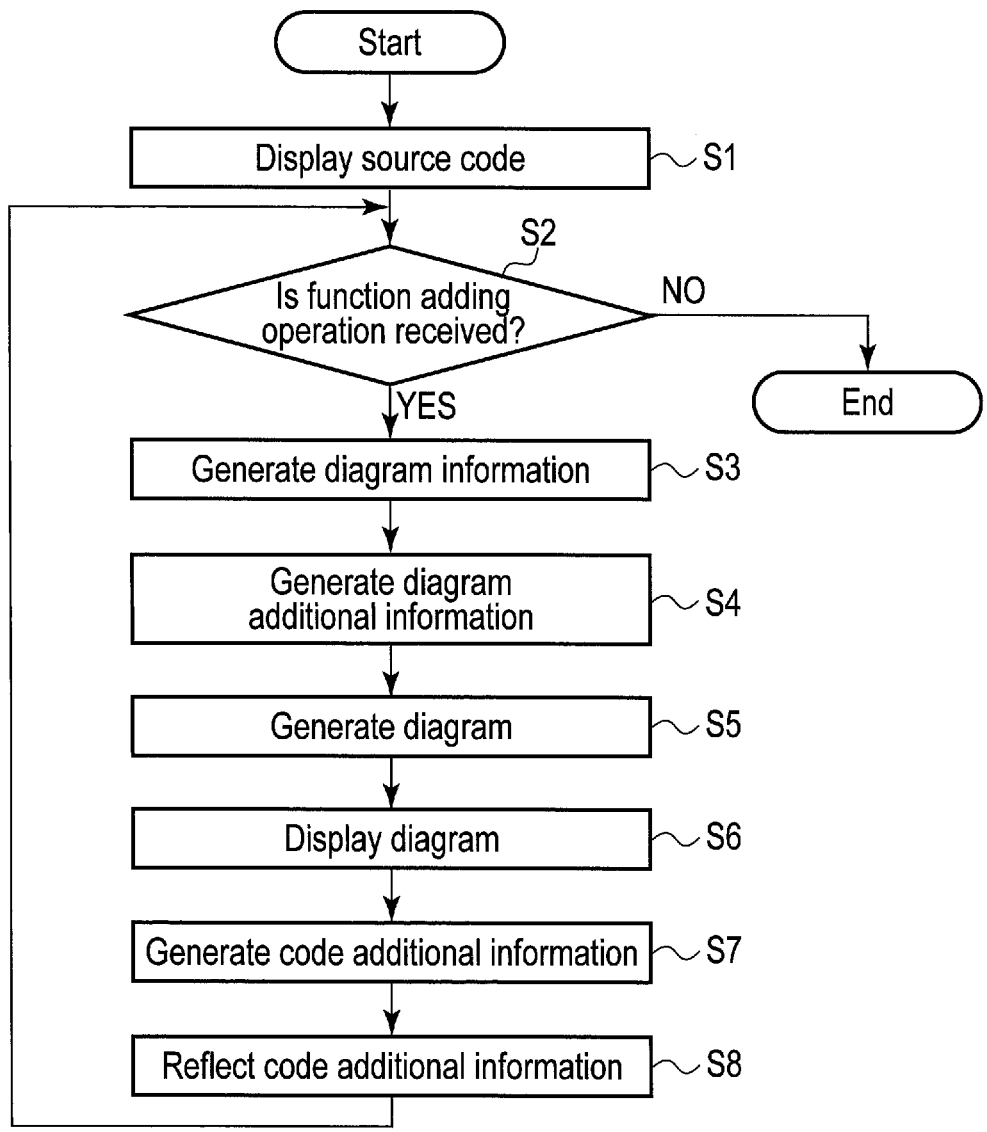
FIG. 7 is a view illustrating an example of a data structure of diagram additional information.
FIG. 8 is a flowchart illustrating an example of a processing procedure of a diagram display process.

In general, according to one embodiment, an electronic calculator includes a processor. The processor is configured to display a screen image on which a first area displaying a source code and a second area displaying a diagram representing at least a part of the source code are arranged and edit the diagram displayed in the second area.

Various embodiments will be described hereinafter with reference to the accompanying drawings.

An electronic calculator according to the present embodiment is used to support understanding (code reading) of a content of a source code written in a program language, for example, Java (registered trademark), C language, or the like. Hereinafter, the electronic calculator according to the present embodiment will be referred to as a code reading support device for convenience.

FIG. 1 is a block diagram illustrating an example of a functional configuration of the code reading support device according to the present embodiment. As illustrated in FIG. 1, a code reading support device 10 includes a code storage 11, a diagram storage 12, a code display processing module 13, a diagram display processing module 14, an operation receiving module 15, and an editing processing module 16.

In the code storage 11, for example, a source code whose content needs to be understood by a user using the code reading support device 10 is stored. In addition, code analysis information indicating an analysis result for the source code stored in the code storage 11 is stored in the code storage 11. Incidentally, a plurality of source codes and code analysis information indicating an analysis result for each of the plurality of source codes may be stored in the code storage 11.

Here, a plurality of functions is included in the source code, and each of the plurality of functions is constituted by at least one code block. In the present embodiment, a code block is a block of codes written over a plurality of lines, for example, and corresponds to a part surrounded by "{" and "}" in the above-described Java, C language, or the like.

In this case, the code analysis information stored in the code storage 11 indicates a function included in the source code stored in the code storage 11, the code block constituting the function, and the like.

Incidentally, it is necessary to analyze the source code in order to obtain the code analysis information, but the analysis of the source code is executed in, for example, an integrated development environment. In addition, Eclipse JDT, Understand, Clang, or the like can be used as a code analysis tool to provide this integrated development environment.

Further, the code storage 11 stores information (hereinafter referred to as code additional information) added to a source code when the source code stored in the code storage 11 is displayed.

The diagram storage 12 stores diagram information used to display a diagram representing at least a part of the source code stored in code storage 11. In addition, the diagram storage 12 stores information (hereinafter referred to as diagram additional information) added to a diagram when the diagram is displayed using the diagram information.

Here, a screen image including at least a code display area (first display area) and a diagram display area (second display area) is displayed in the code reading support device 10 according to the present embodiment.

The code display processing module 13 executes a process of displaying the source code stored in the code storage 11 in the code display area. When displaying the source code in the code display area, the code display processing module 13 adds the code additional information stored in the code storage 11 to the source code.

Using the diagram information stored in the diagram storage 12, the diagram display processing module 14 executes a process of displaying a diagram representing a part of the source code, displayed in the code display area, in the diagram display area. When displaying the diagram in the diagram display area, the diagram display processing module 14 adds the diagram additional information stored in the diagram storage 12 to the diagram. When displaying the diagram, the diagram display processing module 14 uses the code analysis information stored in the code storage 11 described above.

The operation receiving module 15 receives an operation of a user on the source code displayed in the code display area and the diagram displayed in the diagram display area.

The editing processing module 16 edits, for example, the diagram displayed in the diagram display area based on the operation of the user received by the operation receiving module 15. In addition, the editing processing module 16 changes (edits) the code additional information stored in the code storage 11 and the diagram additional information stored in the diagram storage 12 based on the operation of the user received by the operation receiving module 15.

The code reading support device 10 according to the present embodiment has not only a function as a viewer (or editor) of a source code but also a function as an editor of a diagram representing at least a part of the source code.

FIG. 2 illustrates an example of a system configuration of the code reading support device 10 illustrated in FIG. 1. Here, a description will be given assuming that the code reading support device 10 is, for example, a personal computer (PC) or the like, but the code reading support device 10 may be another electronic calculator.

As illustrated in FIG. 2, the code reading support device 10 includes a CPU 101, a nonvolatile memory 102, a main memory 103, a BIOS-ROM 104, a system controller 105, an input device 106, a display device 107, an embedded controller (EC) 108, and the like.

The CPU 101 is a processor that controls an operation of each component inside the code reading support device 10. The CPU 101 executes various programs loaded from the nonvolatile memory 102, which is a storage device, onto the main memory 103. These programs include an operating system (OS) and a program configured to support code reading as described above (hereinafter referred to as a code reading support program), and the like.

In addition, the CPU 101 also executes a basic input/output system (BIOS) stored in the BIOS-ROM 104. The BIOS is a program for hardware control.

The system controller 105 is a device that connects a local bus of the CPU 101 and various components.

Examples of the input device 106 include a keyboard, a mouse, and the like. Examples of the display device 107 include a display such as a liquid crystal display device, and the like. The EC 108 is a one-chip microcomputer including an embedded controller for power management.

Although FIG. 2 illustrates only the CPU 101, the nonvolatile memory 102, the main memory 103, the BIOS-ROM 104, the system controller 105, the input device 106, the display device 107, and the EC 108, the code reading support device 10 may include another storage device such as a hard disk drive (HDD) and a solid state drive (SSD), for example, or may include a communication device configured to perform communication with an external device.

In the present embodiment, the code storage 11 and the diagram storage 12 illustrated in FIG. 1 are implemented by using, for example, the nonvolatile memory 102 illustrated in FIG. 2 or another storage device.

In the present embodiment, some or all of the modules 13 to 16 illustrated in FIG. 1 are implemented by causing, for example, the CPU 101 illustrated in FIG. 2 (that is, a computer of the code reading support device 10) to execute the above-described code reading support program, that is, by software. The code reading support program can be distributed in the state of being stored in advance in a non-transitory computer-readable storage medium. In addition, the code reading support program may be downloaded to the code reading support device 10 via a network, for example.

Here, the description has been given assuming that some or all of the modules 13 to 16 are implemented by software, but some or all of the modules 13 to 16 may be implemented by hardware, for example, or may be implemented by a combination of software and hardware.

Hereinafter, various types of information stored in the code storage 11 and the diagram storage 12 illustrated in FIG. 1 will be described.

First, the code analysis information stored in the code storage 11 will be described with reference to FIGS. 3 and 4. As described above, the source code stored in the code storage 11 includes the plurality of functions, and each of the functions is constituted by at least one code block. The code analysis information includes function information indicating the function included in the source code and code block information indicating the code block constituting the function.

FIG. 3 illustrates an example of a data structure of the function information included in the code analysis information described above. As illustrated in FIG. 3, the function information includes a source code ID, a function ID, and position information.

The source code ID is identification information configured to identify a source code stored in the code storage 11.

The function ID is identification information configured to identify a function included in the source code identified by the source code ID associated with the function ID.

The position information indicates a position of the function identified by the function ID associated with the position information in the source code stored in the code storage 11 (that is, the source code identified by the source code ID associated with the position information). Incidentally, the position information included in the function information includes a line number (a start line and an end line) in which the function in the source code is described, and the like.

Function information 111a and 111b is illustrated in the example illustrated in FIG. 3. The function information 111a includes a source code ID "1", a function ID "1", and position information "x1 to x2". According to this function information 111a, it is indicated that a source code identified by the source code ID "1" includes a function identified by the function ID "1", and the function is described in lines x1 to x2 in the source code.

On the other hand, the function information 111b includes a source code ID "1", a function ID "2", and position information "y1 to y2". According to this function information 111b, it is indicated that a source code identified by the source code ID "1" includes a function identified by the function ID "2", and the function is described in lines y1 to y2 in the source code.

Although only the function information 111a and 111b has been described in FIG. 3 for the sake of convenience, the code analysis information stored in the code storage 11 includes function information for each function included in the source code stored in the code storage 11.

FIG. 4 illustrates an example of a data structure of the code block information included in the code analysis information. As illustrated in FIG. 4, the code block information includes a function ID, a code block ID, and position information.

The function ID is the function ID included in the function information described above and is identification information configured to identify a function included in the source code stored in the code storage 11.

The code block ID is identification information configured to identify a code block constituting the function identified by the function ID associated with the code block ID.

The position information indicates a position of the code block identified by the code block ID associated with the position information in the source code stored in the code storage 11. The position information included in the code block information includes a line number or the like in which the code block in the source code is described.

Code block information 112a and 112b is illustrated in the example illustrated in FIG. 4. The code block information 112a includes a function ID "1", a code block ID "1", and position information "x11 to x12". According to this code block information 112a, it is indicated that a function identified by function ID "1" is constituted by a code block identified by the code block ID "1", and the code block is described in lines x11 to x12 in the source code.

On the other hand, the code block information 112b includes a function ID "1", a code block ID "2", and position information "x13 to x14". According to this code block information 112b, it is indicated that a function identified by function ID "1" is constituted by a code block identified by the code block ID "2", and the code block is described in lines x13 to x14 in the source code.

Although only the code block information 112a and 112b has been described in FIG. 4 for the sake of convenience, the code analysis information stored in the code storage 11 includes code block information for each code block constituting the functions included in the source code stored in the code storage 11.

As illustrated in FIG. 4, one function (that is, the function identified by the function ID "1") may be constituted by a plurality of code blocks (that is, code blocks identified by each of the code block IDs "1" and "2"), and the function may have a nested structure such that another code block is described in one code block, for example. In addition, the function itself may be handled as one code block.

FIG. 5 illustrates an example of a data structure of the code additional information stored in the code storage 11. As illustrated in FIG. 5, the code additional information includes a source code ID, an additional content, and position information.

The source code ID is identification information configured to identify a source code stored in the code storage 11.

The additional content indicates a content to be added to a source code when the source code identified by the source code ID associated with the additional content is displayed in the code display area. In the present embodiment, for example, a comment, highlight information, and the like are added to the source code displayed in the code display area.

The position information indicates a position (part) of the source code stored in the code storage 11 (that is, the source code identified by the source code ID associated with the position information) to which the comment or highlight information is to be added according to the additional content associated with the position information. Incidentally, the position information included in the code additional information includes a line number and the like, which is similar to the position information included in the function information and the code block information described above.

Code additional information 113a and 113b is illustrated in the example illustrated in FIG. 5. The code additional information 113a includes a source code ID "1", an additional content "highlight" and position information "x1 to x2". According to this code additional information 113a, it is indicated that the highlight information is added to lines x1 to x2 in the source code identified by the source code ID "1" when the source code is displayed in the code display area.

When the highlight information is added to the source code, it is sufficient to add, for example, a figure, a symbol, or a mark indicating the state of being highlighted to a corresponding part of the source code (that is, the position indicated by the position information included in the code additional information), but a font (a typeface, a thickness, a color, or the like) of the part (text) may be changed. That is, "to add the highlight information to (a part of) the source code" means to perform predetermined processing on the corresponding part of the source code such that a user can grasp that the part of the source code is highlighted, in the present embodiment. In the following description, to add the highlight information to the source code will be expressed as to perform highlight display of the source code for the sake of convenience.

On the other hand, the code additional information 113b includes a source code ID "1", an additional content "Comment 1", and position information "x15". According to this code additional information 113b, it is indicated that Comment 1 is added to line x15 in the source code identified by the source code ID "1" when the source code is displayed in the code display area.

Although only the code additional information 113a and 113b has been described in FIG. 5 for the sake of convenience, another additional information may be stored in the code storage 11.

In addition, only the addition of the comment and the highlight information as the additional content has been described in the example illustrated in FIG. 5, but the additional content may be another content as long as the content is added to the source code (that is, changes display of the source code) when the source code is displayed.

Next, FIG. 6 illustrates an example of a data structure of the diagram information stored in the diagram storage 12. As illustrated in FIG. 6, the diagram information includes a diagram ID, a calling function ID, and a called function ID.

The diagram ID is identification information configured to identify a diagram displayed in the above-described diagram display area.

The calling function ID is identification information configured to identify a function (first function) included in the source code stored in the code storage 11. It is assumed that the function identified by the calling function ID is defined so as to include a function identified by the called function ID associated with the calling function ID.

The called function ID is identification information configured to identify a function (second function) included in the source code stored in the code storage 11. The function identified by the called function ID is a function described in the function identified by the calling function ID associated with the called function ID described above.

That is, the function identified by the calling function ID is a calling function, and the function identified by the called function ID is a called function. Thus, the calling function ID and the called function ID included in the diagram information are used to represent a calling relationship among a plurality of functions in the diagram displayed using the diagram information.

Diagram information 121*a* and 121*b* is illustrated in the example illustrated in FIG. 6. The diagram information 121*a* includes a diagram ID "1", a calling function ID "1", and a called function ID "2". According to the diagram information 121*a*, it is indicated that a diagram identified by the diagram ID "1" represents a calling relationship in which a function identified by the called function ID "2" is called in the function identified by the calling function ID "1".

On the other hand, the diagram information 121*b* includes a diagram ID "1", a calling function ID "2", and a called function ID "3". According to the diagram information 121*b*, it is indicated that a diagram identified by diagram ID "1" represents a calling relationship in which a function identified by the called function ID "3" is called in a function identified by the calling function ID "2".

Although only the diagram information 121*a* and 121*b* has been described in FIG. 6 for the sake of convenience, another diagram information may be stored in the diagram storage 12.

As illustrated in FIG. 6, a diagram (for example, the diagram identified by the diagram ID "1") may represent a plurality of calling relationships.

FIG. 7 illustrates an example of a data structure of the diagram additional information stored in the diagram storage 12. As illustrated in FIG. 7, the diagram additional information includes a diagram ID, an additional content, and position information.

The diagram ID is identification information configured to identify a diagram displayed in the diagram display area.

The additional content indicates a content to be added to a diagram when the diagram identified by the diagram ID associated with the additional content is displayed in the diagram display area. In the present embodiment, for example, a comment, highlight information, and the like are added to the diagram displayed in the diagram display area.

The position information indicates a position on the diagram identified by the diagram ID associated with the position information to which the comment or highlight information is to be added according to the additional content associated with the position information. For example, the above-described function ID and code block information ID are used as the position information included in the diagram additional information.

Diagram additional information 122*a* and 122*b* is illustrated in the example illustrated in FIG. 7. The diagram additional information 122*a* includes a diagram ID "1", an additional content "highlight" and position information "Function ID "1"". According to the diagram additional information 122*a*, it is indicated that highlight information is added to a position expressing a function identified by the function ID "1" when a diagram identified by the diagram ID "1" is displayed in the diagram display area.

When the highlight information is added to the diagram, it is sufficient to add, for example, a color indicating the state of being highlighted to the corresponding part of the diagram (that is, the position indicated by the position information included in the diagram information), but a symbol, a mark, a pattern, or the like indicating the state of being highlighted may be added to the part. That is, "to add the highlight information to (a part of) the diagram" means to perform predetermined processing on the corresponding part of the diagram such that a user can grasp that the part of the diagram is highlighted, in the present embodiment. In the following description, to add the highlight information to the diagram will be expressed as to perform highlight display of the diagram for the sake of convenience.

On the other hand, the diagram additional information 122*b* includes a diagram ID "1", an additional content "Comment 2", and position information "Code Block ID "1"". According to the diagram additional information 122*b*, it is indicated that Comment 2 is added to a position expressing a code block identified by the code block ID "1" when a diagram identified by the diagram ID "1" is displayed in the diagram display area.

Although not only the function included in the source code but also the code block constituting the function can be represented in the diagram, a specific example of the diagram will be described later.

Although the various types of information used in the present embodiment have been described with reference to FIGS. 3 to 7, the information described in FIGS. 3 to 7 is an example, and a part of the information may be omitted, or another information (item) may be included in the information.

In addition, the data structures illustrated in FIGS. 3 to 5 are examples, and the code analysis information (function information and information) and the code additional information stored in the code storage 11 may be managed collectively as a single piece of information. Similarly, the data structures illustrated in FIGS. 6 and 7 are examples, and the diagram information and the diagram additional information stored in the diagram storage 12 may be managed collectively as a single piece of information.

Next, an operation of the code reading support device 10 according to the present embodiment will be described. Here, a description will be given mainly regarding each of a process (hereinafter referred to as a diagram display process) at the time of generating a diagram representing a part of the source code and displaying the generated diagram, a process (hereinafter referred to as a comment addition process) at the time of adding a comment to the source code, and a process (hereinafter referred to as a highlight display change process) at the time of changing presence or absence of highlight display with respect to the source code.

First, an example of a processing procedure of the diagram display process will be described with reference to a flowchart of FIG. 8.

The user using the code reading support device 10 activates the above-described code reading support program on the code reading support device 10.

Figure 9:
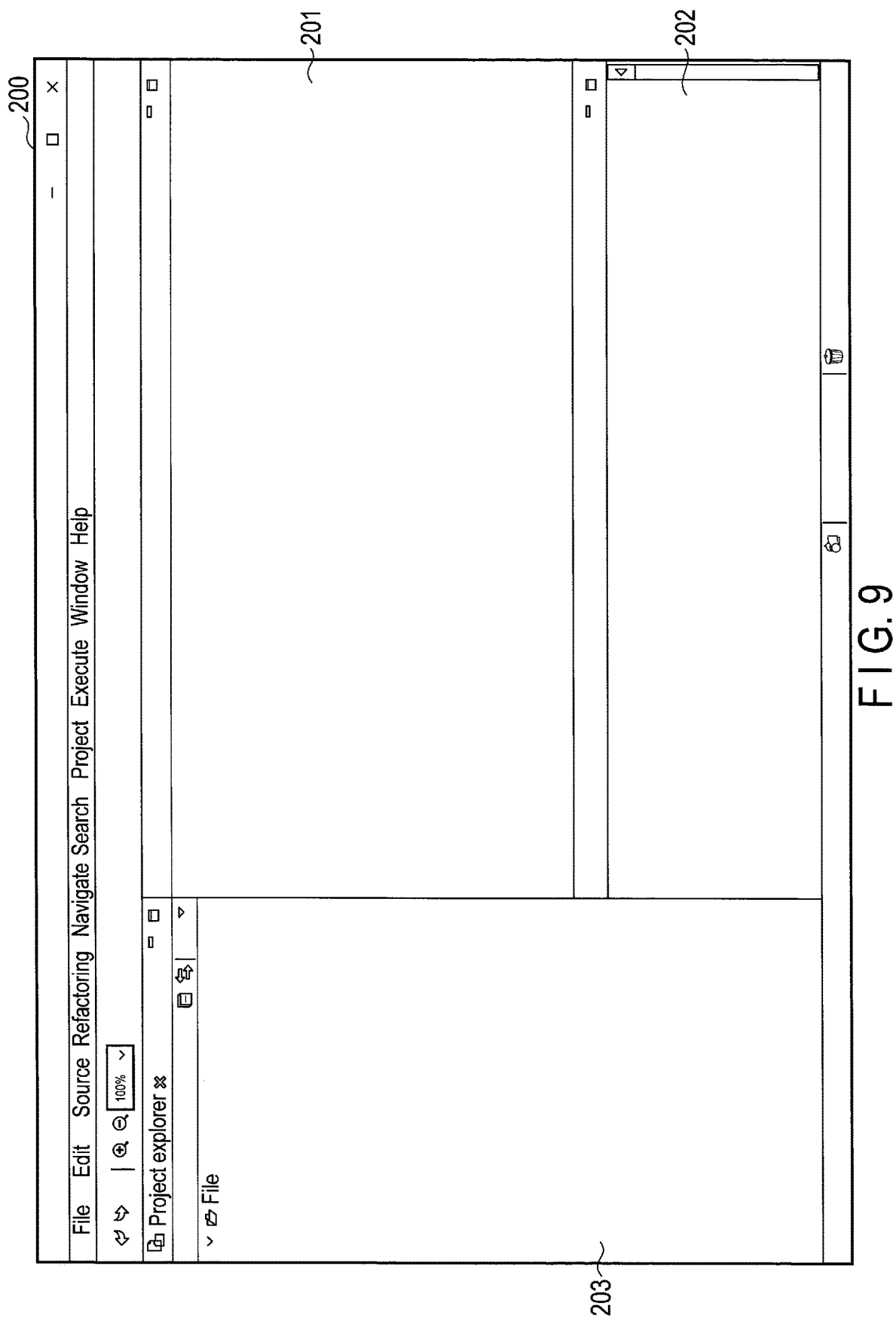
FIG. 9 is a view illustrating an example of a display screen image when a code reading support program is activated.

When the code reading support program has been activated on the code reading support device 10, a screen image as illustrated in FIG. 9 is displayed on the display device 107 (display) provided in the code reading support device 10.

As illustrated in FIG. 9, a screen image (hereinafter referred to as a display screen image) 200 displayed on the code reading support device 10 includes a code display area 201 and a diagram display area 202.

In the example illustrated in FIG. 9, the code display area 201 and the diagram display area 202 are arranged side by side to be adjacent to each other in the up-down direction, for example. Incidentally, the code display area 201 and the diagram display area 202 may be arranged to be adjacent to each other in the left-right direction, for example.

In addition, the display screen image 200 further includes a file selection area 203. In the file selection area 203, for example, the user can select a source code (file) to be displayed in the code display area 201.

The user can create the diagram representing a part of the source code by performing various operations on the above-described display screen image 200.

In addition, when diagram information (a file) to display a diagram created in the past, for example, has been selected in the file selection area 203, the diagram can also be displayed in the diagram display area 202.

Here, the user selects a source code (file) in the file selection area 203 when creating the diagram representing a part of the source code as described above.

In this case, the code display processing module 13 displays the source code (hereinafter referred to as a target source code) selected by the user in the code display area 201 (Step S1).

When it is difficult to display the entire target source code in the code display area 201, the target source code is partially displayed in the code display area 201. In this case, the user can display a desired part of the target source code by scrolling the display of the code display area 201 using the input device 106 (for example, a mouse, a keyboard, and the like) provided in the code reading support device 10.

When the processing of Step S1 is executed, the user displays one (hereinafter referred to as a first target function) of a plurality of functions included in the target source code in the code display area 201, and performs an operation (referred to as a function adding operation) of designating the first target function. The user can instruct to add the first target function to the diagram by performing such a function adding operation. Incidentally, the function adding operation includes an operation of moving a cursor to a position where (a definition of) the first target function is described in the code display area 201, but may be another operation.

The operation receiving module 15 determines whether the above-described function adding operation has been received (performed by the user) (Step S2).

If it is determined that the function adding operation has been received (YES in Step S2), the editing processing module 16 generates diagram information to be used to display a diagram (hereinafter referred to as a target diagram) to which the above-described first target function (part of the target source code) has been added (Step S3). In this case, the editing processing module 16 generates diagram information including a diagram ID configured to identify a target diagram and a function ID (calling function ID) configured to identify a first target function. The diagram information generated in Step S3 is stored in the diagram storage 12.

Next, the editing processing module 16 generates diagram additional information to be added to the target diagram displayed using the diagram information generated in Step S3 (Step S4). In this case, the editing processing module 16 generates diagram additional information including, for example, a diagram ID configured to identify a target diagram, an additional content "highlight" and a function ID (position information) configured to identify a first target function. The diagram additional information generated in Step S4 is stored in the diagram storage 12.

When the processing of Step S4 is executed, the diagram display processing module 14 generates the target diagram based on the diagram information and the diagram additional information stored in the diagram storage 12 (Step S5).

According to the above-described diagram information and diagram additional information, the target diagram in which the first target function is added and the first target function is highlighted and displayed is generated in Step S5. The target diagram generated in Step S5 is displayed in the diagram display area 202 (Step S6).

In addition, the editing processing module 16 generates additional information (hereinafter referred to as code additional information) to be added to the target source code in response to the addition of the above-described first target function to the target diagram (that is, notification of the change of the target diagram) (Step S7). In this case, the editing processing module 16 generates code additional information including, for example, a source code ID configured to identify a target source code displayed in Step S1, an additional content "highlight", and a line number (position information) in which a first target function is described. The code additional information generated in Step S7 is stored in the code storage 11.

When the processing of Step S7 is executed, the code display processing module 13 reflects the code additional information stored in the code storage 11 to the target source code displayed in the code display area 201 (Step S8). According to the above-described code additional information, a part in which the first target function of the target source code displayed in the code display area 201 is described is highlighted and displayed by executing the processing of Step S8. Accordingly, a function that has been added to the target diagram and a function that has not been added to the target diagram can be displayed in a distinguished manner in the target source code.

When the processing of Step S8 is executed, the processing returns to Step S2 and the processing is repeated. Here, the part in which the first target function of the target source code is described is displayed in the code display area 201. Meanwhile, the user can execute a function adding operation of designating another function (hereinafter referred to as a second target function) described in the first target function after the processing of Step S8 has been executed. The user instructs to add the second target function to the diagram by performing this function adding operation.

If it is determined in Step S2 that such a function adding operation has been received, a part in which a definition of the second target function is described is displayed in the code display area 201, and the processing of Step S3 and the subsequent steps is executed.

Incidentally, the second target function is described in the first target function, and thus, corresponds to a called function in the case where the first target function is used as a calling function. In this case, diagram information including a diagram ID configured to identify a target diagram, a function ID (calling function ID) configured to identify a first target function, and a function ID (called function ID) configured to identify a second target function is generated in Step S3. Accordingly, the second target function is added to the target diagram, and a calling relationship between the first target function and the second target function can be represented in the target diagram.

The above-described relationship between the first target function (calling function) and the second target function (called function) can be determined based on, for example, the code analysis information (that is, a position at which each function is described) stored in the code storage 11 described above, but information in which the relationship has been specified (for example, calling point information including a connection line and a connection destination in the target source code) may be separately managed within the code reading support device 10.

Since the processing of Steps S4 to S7 to be executed hereinafter is the same as described above, the detailed description thereof will be omitted here.

According to the above-described diagram display process, it is possible to add the function, designated (for which the function adding operation has been performed) by the user among the functions included in the target source code, to the target diagram and to automatically represent the calling relationship between the added functions in the target diagram.

If it is determined in Step S2 that the function adding operation has not been received (NO in Step S2), the diagram display process is ended.

Although the description has been given assuming that the processing is executed in the order of Steps S3 to S7 in FIG. 8, but the order of the processing may be changed as appropriate.

Specifically, for example, the processing of Steps S3 to S5 may be executed after the processing of Steps S7 and S8.

Figure 10:
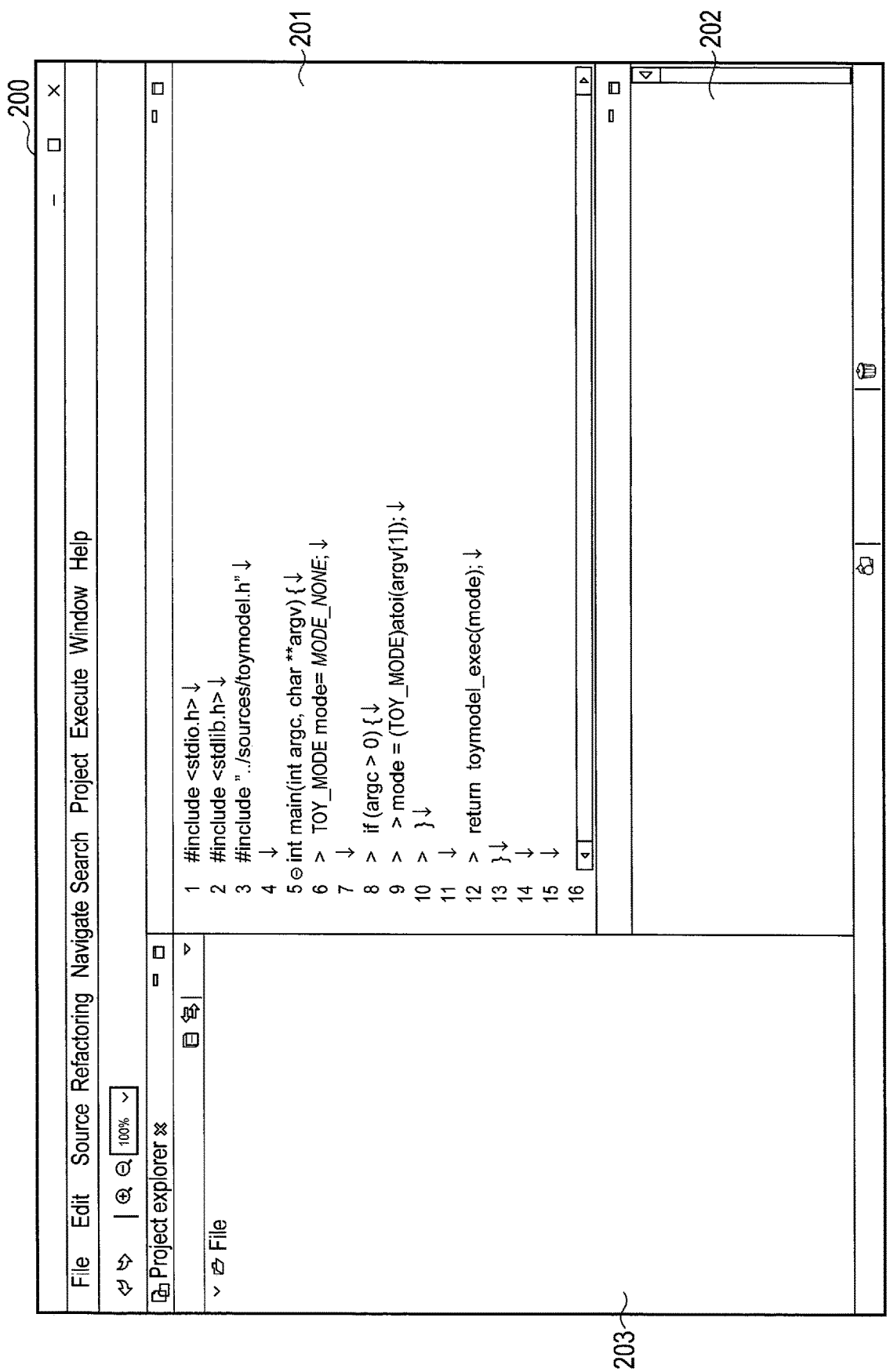
FIG. 10 is a view illustrating an example of a display screen image when a source code is displayed in a code display area.

Hereinafter, the above-described diagram display process will be specifically described. FIG. 10 illustrates an example of a screen image (display screen image) displayed on the code reading support device 10 when the processing of Step S1 illustrated in FIG. 8 is executed.

As illustrated in FIG. 10, the target source code is displayed in the code display area 201 included in the display screen image 200 when Step S1 illustrated in FIG. 8 is executed. In the example illustrated in FIG. 10, a part (lines 5 to 13) in which a definition of a main function included in the target source code is described is displayed in the code display area 201. In FIG. 10, a numerical value attached to the left of each line of the target source code indicates the line number.

The user can perform a function adding operation of designating, for example, the main function on the display screen image 200 illustrated in FIG. 10. In this case, the user instructs to add the main function to the diagram by, for example, positioning the cursor at a part of the code display area 201 in which the definition of the main function is described.

When the main function has been designated as described above, the processing of Steps S3 to S6 illustrated in FIG. 8 is executed. In Step S3 in this case, diagram information including a diagram ID configured to identify a target diagram to which the main function is to be added, and a function ID (calling function ID) configured to identify the main function is generated. Since a function corresponding to a called function has not been designated at this point in time, a called function ID is not included in the diagram information.

In Step S4, diagram additional information including the diagram ID (diagram ID configured to identify the target diagram) included in the diagram information generated in Step S3, an additional content "highlight" and a function ID (position information) configured to identify the main function is generated.

In Step S5, the target diagram is generated based on the diagram information generated in Step S3 and the diagram additional information generated in Step S4. In Step S5, the target diagram including a symbol (hereinafter referred to as a function symbol) representing the main function identified by the function ID (calling function ID) included in the diagram information is generated.

Here, the above-described function symbol will be specifically described with reference to FIG. 11. Here, a description will be given using a function different from the above-described main function for the sake of convenience.

Figure 11:
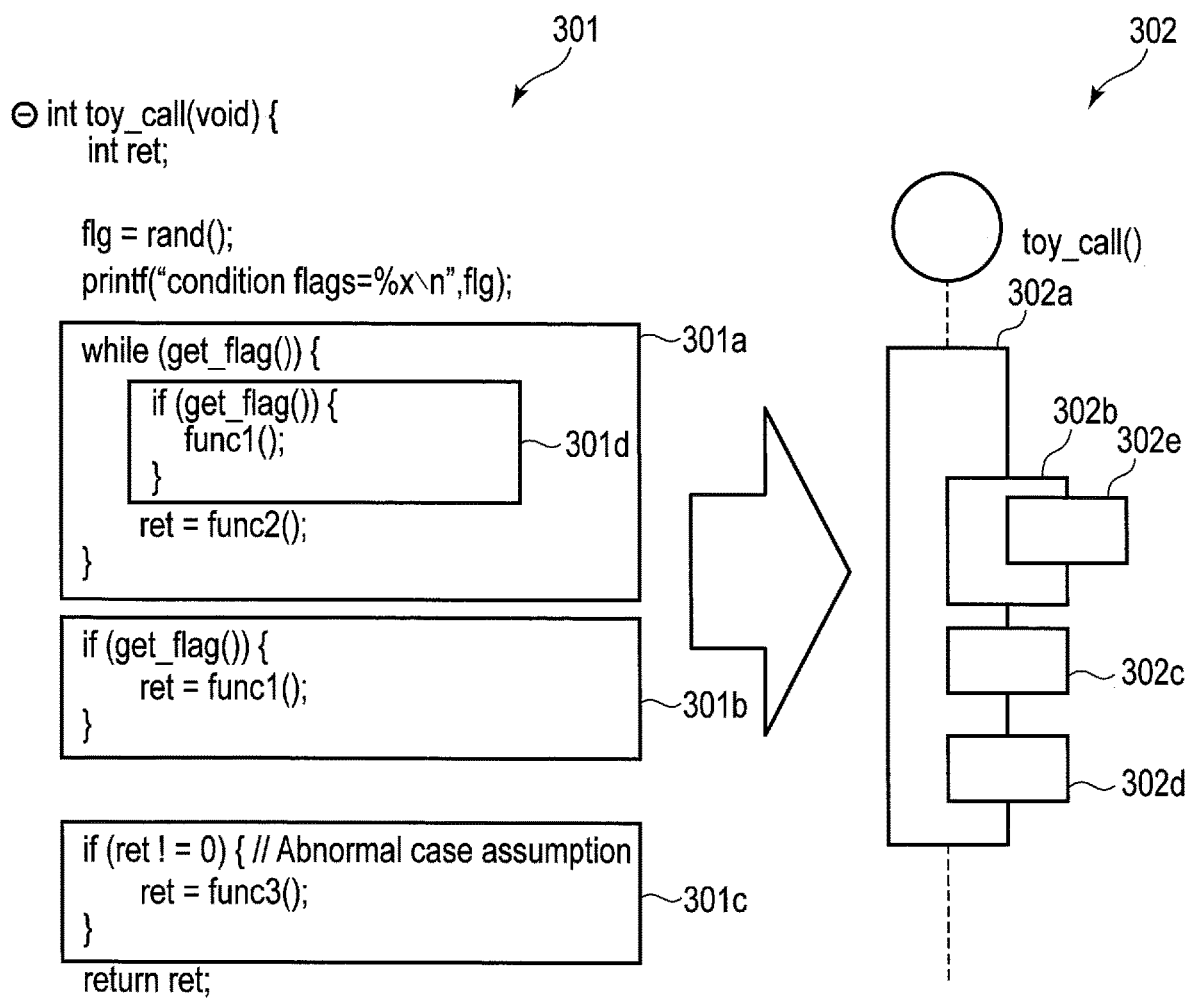
FIG. 11 is a view for specifically describing a function symbol.

A function 301 (toy_call function) illustrated on the left side of FIG. 11 is constituted by a code block 301a corresponding to a while statement, and code blocks 301b and 301c corresponding to if statements. In addition, the code block 301a further includes a code block 301d corresponding to an if statement.

A function symbol 302 representing such a function 301 is constituted by a main symbol 301a representing the entire function 301 and sub-symbols 302b to 302e representing each of the code blocks 301a to 301d constituting the function 301.

Incidentally, positions at which the sub-symbols 302b to 302e are arranged in the function symbol 302 (main symbol 302a) are determined based on the code analysis information (function information and code block information) stored in the code storage 11. Specifically, the sub-symbol 302b, for example, is arranged on the main symbol 302a corresponding to a position where the code block 301a represented by the sub-symbol 302b is described in the function 301. The same description is applied to the other sub-symbols 302c to 302e.

That is, in the present embodiment, it is possible to generate a function symbol constituted by a main symbol expressing the entire function and a sub-symbol representing a code block constituting the function by specifying a code block (position where the code block is described) constituting the function, identified using a function ID (a calling function ID and a called function ID) included in diagram information, based on code block information including the function ID.

The target diagram including the function symbol generated as described above is displayed in the diagram display area 202 in Step S6.

When the above-described processing of Steps S3 to S6 has been executed, the processing of Steps S7 and S8 is executed. In Step S7 in this case, code additional information including a source code ID configured to identify a target source code, an additional content "highlight", and position information "(line) 5 to (line) 13" is generated. In Step S8, the code additional information generated in Step S7 is reflected to the target source code displayed in the code display area 201.

Figure 12:
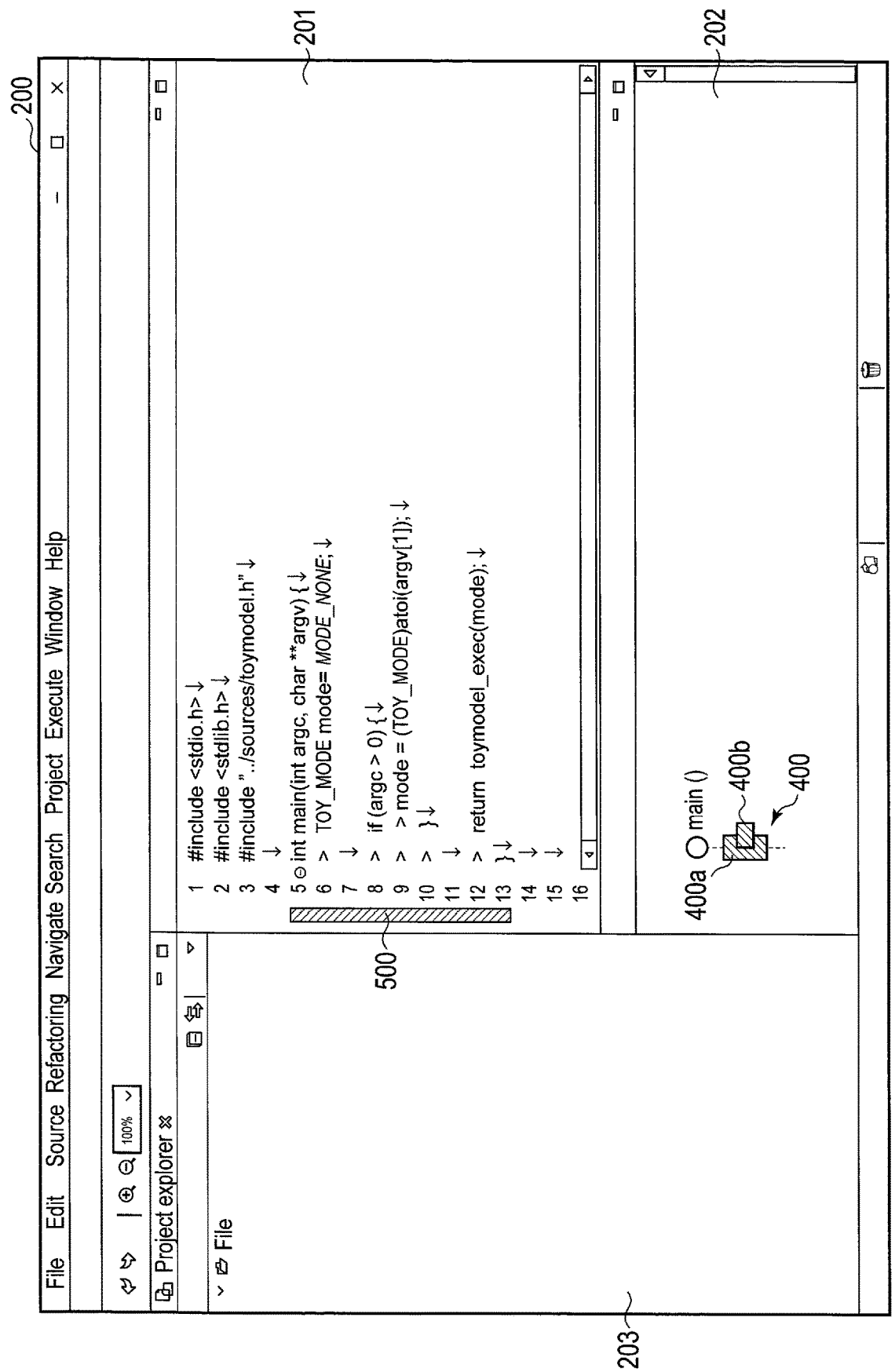
FIG. 12 is a view for specifically describing the diagram display process.

Here, FIG. 12 illustrates an example of the display screen image 200 after the above-described processing of Steps S3 to S8 has been executed.

Although a detailed description is omitted, a function symbol 400 representing a main function illustrated in FIG.

12 is constituted by a main symbol 400a representing the entire main function and a sub-symbol 400b representing a code block (a code block corresponding to an if statement) constituting the main function. In addition, the function symbols 400 (the main symbol 400a and the sub-symbol 400b) displayed in the diagram display area 202 are highlighted and displayed (for example, displayed with a color) based on the above-described diagram additional information.

In addition, a part in which a definition of the main function is described is highlighted and displayed in the code display area 201. Specifically, a highlight display line 500 with a color (for example, blue or the like) is applied to a part where the definition of the main function displayed in the code display area 201 illustrated in FIG. 12 is described, for example, in order to indicate the state of being highlighted and displayed.

Since a function included in the target source code in the code display area 201 is designated in the present embodiment as described above, it is possible to display the target diagram including the function symbol representing the function in the diagram display area 202, and it is possible to perform highlight display of the part in which the function displayed in the code display area 201 is described.

Next, the user can designate another function described in the main function displayed in the code display area 201 (that is, perform a function adding operation on the other function). In the code display area 201 illustrated in FIG. 12, for example, a toymodel_exec function included in the main function is designated.

When the toymodel_exec function is designated in the code display area 201 illustrated in FIG. 12, a part in which a definition of the toymodel_exec function is described is displayed in the code display area 201 included in the display screen image 200 as illustrated in FIG. 13 (that is, the display of the code display area 201 is shifted from the main function to the toymodel_exec function). In FIG. 13, only a part of the toymodel_exec function is displayed.

Here, the processing of Steps S3 to S6 illustrated in FIG. 8 is executed. In Step S3 in this case, diagram information including a diagram ID configured to identify a target diagram to which the toymodel_exec function is added, a function ID (calling function ID) configured to identify the main function, and a function ID (called function ID) configured to identify the toymodel_exec function is generated.

In Step S4, diagram additional information including the diagram ID included in the diagram information generated in Step S3, an additional content "highlight" and a function ID (position information) configured to identify the toymodel_exec function is generated.

In Step S5, the target diagram is generated based on the diagram information generated in Step S3 and the diagram additional information generated in Step S4.

In Step S5 in this case, a function symbol (hereinafter referred to as a "main function symbol") representing the main function identified by the calling function ID included in the diagram information is generated. In Step S5, a function symbol (hereinafter referred to as a toymodel_exec function symbol) representing the toymodel_exec function identified by the called function ID included in the diagram information is generated. Since each of the function symbol is the same as described above, the detailed description thereof will be omitted here.

Further, a target diagram representing a calling relationship between the main function (calling function) and the toymodel_exec function (called function) is generated in Step S5.

As a result, the target diagram, which includes the main function symbol and the toymodel_exec function symbol and represents the calling relationship between the main function and the toymodel_exec function, is generated.

The target diagram generated in Step S5 is displayed in the diagram display area 202 in Step S6.

As described above, the processing of Steps S7 and S8 is executed when the processing of Steps S3 to S6 illustrated in FIG. 8 has been executed. In Step S7 in this case, code additional information including a source code ID configured to identify a target source code, an additional content "highlight", and position information "(line) 22 to (line) 42" is generated. Although not illustrated in FIG. 13, the position information "22 to 42" indicates that the definition of the toymodel_exec function is described in lines 22 to 42 in the source code. In Step S8, the code additional information generated in Step S7 is reflected to the target source code displayed in the code display area 201.

Here, FIG. 14 illustrates an example of the display screen image 200 after the processing of Steps S3 to S8 has been executed as the toymodel_exec function is designated by the user as described above.

As illustrated in FIG. 14, a target diagram including a main function symbol 400 and a toymodel_exec function symbol 600 is displayed in the diagram display area 202 included in the display screen image 200. Incidentally, the main function symbol 400 is the same function symbol as the main function symbol 400 displayed in the diagram display area 202 illustrated in FIG. 12.

On the other hand, the toymodel_exec function symbol 600 is constituted by a main symbol 600a representing the entire toymodel_exec function and sub-symbols 600b to 600f representing the respective code blocks constituting the toymodel_exec function.

In the target diagram displayed in the diagram display area 202 illustrated in FIG. 14, the main function symbol 400 (the main symbol 400a and the sub-symbol 400b) and the toymodel_exec function symbol 600 (the main symbol 600a and the sub-symbols 600b to 600f) are highlighted and displayed based on the above-described diagram additional information.

Further, the target diagram displayed in the diagram display area 202 includes a calling line (arrow from the main function symbol to the toymodel_exec function) 700 connecting the main function symbol and the toymodel_exec function symbol. As a result, it is possible to represent a calling relationship in which the main function is the calling function and the toymodel_exec function is the called function, in the target diagram.

Here, the toymodel_exec function is included in a part other than a code block corresponding to an if statement constituting the main function in the main function displayed in the code display area 201 illustrated in FIGS. 10 and 12. In this case, the calling line 700 representing a connection relationship between the main function and the toymodel_exec function is connected to the main symbol 400a (below the sub-symbol 400b) of the main function symbol 400 as illustrated in FIG. 14.

That is, a calling line (arrow) representing a calling relationship between a calling function and a called function is connected to a position (main symbol or sub-symbol) corresponding to a position where the called function inside the calling function is described, in the present embodiment.

For example, when a called function is described in a code block constituting a calling function, a calling line representing a calling relationship between the calling function and the called function is connected to a sub-symbol representing the code block.

Although the connection on the calling function side of the calling line has been described here, it is sufficient for the calling line to be connected to a called function name or the like on the called function side, for example, as illustrated in FIG. 14.

In addition, the target diagram displayed in the diagram display area 202 may further include an indicator 800. The indicator 800 represents a part of a target source code displayed in the code display area 201 in the target diagram. In other words, when a function is displayed as a part of the target source code in the code display area 201, the indicator 800 indicates a function symbol representing the function.

Specifically, when the indicator 800 is attached to the function symbol 600, for example, as illustrated in FIG. 14, the indicator 800 indicates that a part where a definition of a function represented by the function symbol 600 is described is displayed in the code display area 201.

Although FIG. 14 illustrates an example in which the indicator 800 is a triangular mark, the indicator 800 may have another shape. In addition, the indicator 800 may be expressed by a figure, a symbol, a character, a color, or the like as long as it is possible to grasp the part of the target source code displayed in the code display area 201.

In addition, the part in which the definition of the toymodel_exec function is described is highlighted and displayed in the code display area 201. Specifically, a highlight display line 900 with a color is applied to the part where the definition of the toymodel_exec function displayed in the code display area 201 illustrated in FIG. 14 is described, for example, in order to indicate the state of being highlighted.

Here, the case where the main function and the toymodel_exec function are sequentially designated (that is, the main function and the toymodel_exec function are added to the diagram) has been described. When another function (a function described in the toymodel_exec function) is specified after the toymodel_exec function, the same processing as the above-described processing of Steps S3 to S8 is executed. As such processing is repeated, the diagram, which includes the function symbol (main symbol and sub-symbol) representing each of the plurality of functions designated by the user and represents the calling relationship between the plurality of functions, can be displayed in the diagram display area 202.

Although the description has been given assuming that the processing of Steps S3 to S8 is executed each time a function is designated in the process illustrated in FIG. 8, it may be configured such that the processing of Steps S3 to S8 may be executed after a plurality of functions has been designated, for example. Incidentally, a timing at which the processing of Steps S3 to S8 is executed may be instructed by the user.

Figure 15:
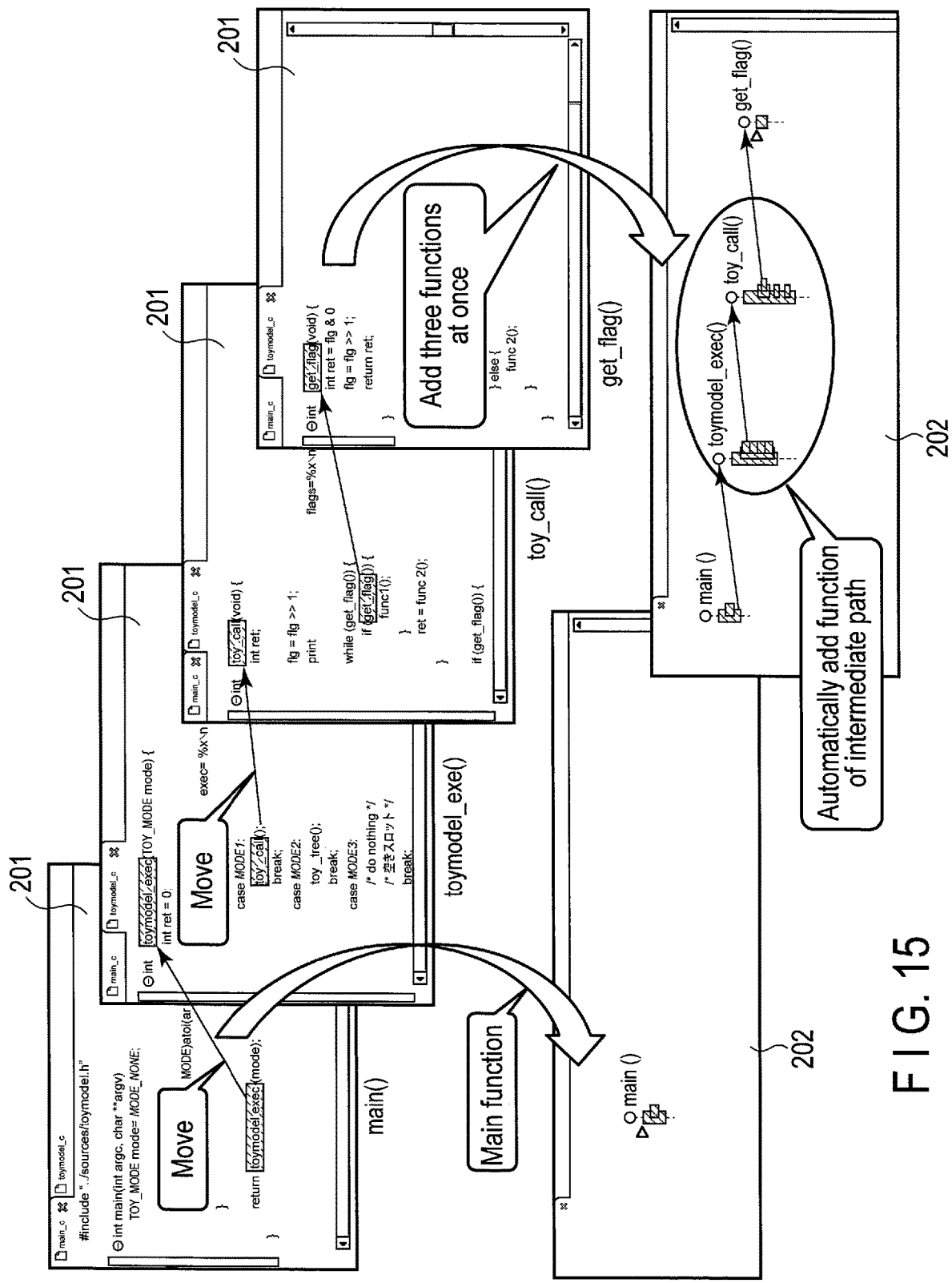
FIG. 15 is a view for describing a case where after a plurality of functions has been designated, a function symbols representing the plurality of functions are added.

Specifically, it is assumed that the toymodel_exec function described in the main function in the code display area 201, a toy_call function described in the toymodel_exec function, a get_flag function described in the toy_call function are sequentially designated after the diagram to which the above-described main function has been added is displayed in the diagram display area 202 as illustrated in FIG. 15. Incidentally, each of functions designated by the user and the order in which the respective functions have been designated (that is, a function of an intermediate path) are held (stored) in the code reading support device 10. When the user instructs, for example, to display (generate) a diagram after the get_flag function has been designated, the processing of Steps S3 to S8 illustrated in FIG. 8 is executed. In this case, a diagram including function symbols (the toymodel_exec function symbol, a toy_call function symbol, and a get_flag function symbol) representing the toymodel_exec function, the toy_call function, and the get_flag function, respectively, is displayed in the diagram display area 202. In addition, a calling line (arrow) representing s calling relationship in which the toymodel_exec function is a calling function and toy_call function is called function is displayed in this diagram. Similarly, a calling line (arrow) representing a calling relationship in which the toy_call function is a calling function and the get_flag function is a called function is displayed in this diagram.

In the present embodiment, the user can understand a specific operation (behavior) of the computer based on the target source code (program) by referring to the diagram displayed in the diagram display area 202 by sequentially designating the functions.

Figure 16:
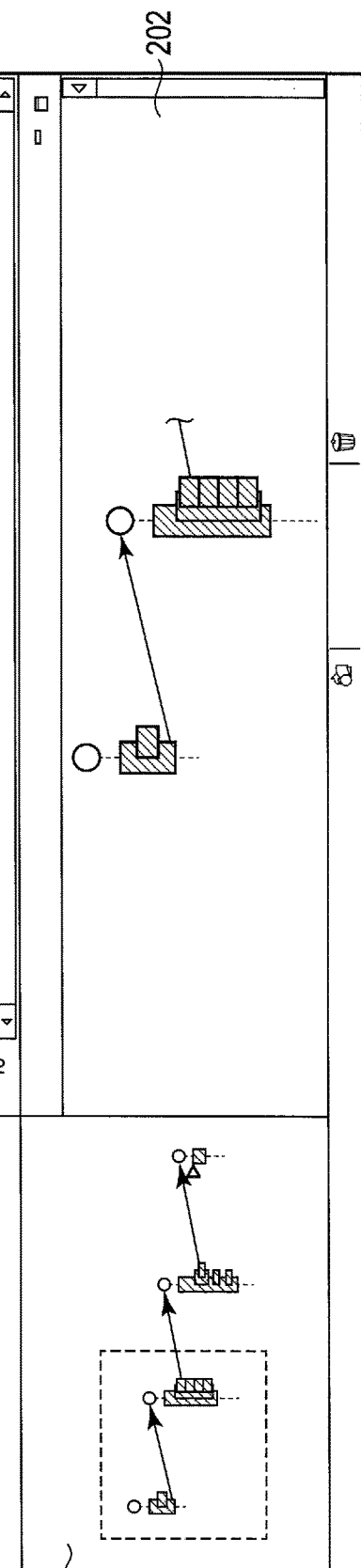
FIG. 16 is a view illustrating an example of a display screen image on which an area configured to display a diagram as a whole is further arranged.

Although the description has been given assuming that the diagram is displayed in the diagram display area 202 in the present embodiment, another area displaying the diagram may be arranged on the display screen image 200. Specifically, an area (third display area) 204 configured to display a diagram as a whole may further be arranged on the display screen image 200, for example, as illustrated in FIG. 16. In this case, a part of the diagram specified in the area 204 displaying the entire diagram may be enlarged and displayed in the diagram display area 202. Incidentally, the entire diagram may be displayed in the diagram display area 202 and a part of the diagram may be displayed in the area 204. Further, it may be configured such that the display and non-display of the area 204 can be selectable by the user.

In addition, the diagram information and the diagram additional information generated in the above-described diagram display process are stored in the diagram storage 12. Thus, when the diagram information and the diagram additional information stored in the diagram storage 12 are designated in the above-described file selection area 203, it is also possible for another user to refer (browse) a diagram created (displayed) using the code reading device 10 by the user.

Further, the description has been given assuming that the function designated by the user is added to the diagram in the present embodiment, but it is also possible to adopt the configuration in which the toymodel_exec function described in the main function, the toy_call function described in the toymodel_exec function, and the get_flag function described in the toy_call function are automatically added to a diagram when the main function has been designated by the user, for example, as illustrated in FIG. 15. In such a configuration, the user may select a function for approving addition to the diagram from among functions (that is, candidates) automatically added to the diagram.

In addition, when a plurality of functions is described in one function, the one function (calling function) may be connected to a plurality of called functions via a plurality of calling lines.

In addition, the description has been given assuming that the function symbol representing the function designated in the function adding operation is generated every time the function designating operation is performed in the above-described diagram display process, but the function symbol representing each of the functions included in the target source code may be generated in advance and managed inside the code reading support device 10.

Next, an example of a processing procedure of the comment addition process will be described with reference to a flowchart of FIG. 17. Incidentally, the comment addition process according to the present embodiment means a process of editing (generating, deleting, and the like) additional information (code additional information and diagram additional information) including a comment as an additional content.

It is assumed that a target source code is displayed in the code display area 201, and a target diagram to which a function (function symbol) designated by a user has been added is displayed in the diagram display area 202 by executing the above-described diagram display process.

Here, the user can add a comment to the target source code displayed in the code display area 201, for example, in the present embodiment. Incidentally, the comment with respect to the target source code can be added in units of lines in which codes are described.

When adding the comment to the target source code as described above, the user displays a part to which the comment of the target source code needs to be added in the code display area 201 and performs an operation of adding the comment (hereinafter referred to as a comment adding operation). The user can add the comment to the target source code by performing this comment adding operation. Incidentally, the comment adding operation includes an operation of designating a line number to which a comment needs to be added, an operation of creating the comment, and the like.

The operation receiving module 15 determines whether the above-described comment adding operation has been received (performed by the user) (Step S11).

When it is determined that the comment adding operation has been received (YES in Step S11), the editing processing module 16 generates code additional information to be added to the target source code (Step S12). In this case, the editing processing module 16 generates the code additional information including a source code ID configured to identify a target source code, the comment (additional content) created by the user in the comment adding operation described above, and a line number (position information) designated by the user in the comment adding operation. The code additional information generated in Step S12 is stored in the code storage 11.

When the processing of Step S12 is executed, the code display processing module 13 reflects the code additional information stored in the code storage 11 to the target source code displayed in the code display area 201 (Step S13). According to the above-described code additional information, the comment is displayed (added) to a part (line) designated by the user in the target source code displayed in the code display area 201 by executing the processing of Step S13.

In addition, the editing processing module 16 generates diagram additional information to be added to the target diagram displayed in the diagram display area 202 (Step S14). In this case, the editing processing module 16 generates the diagram additional information including a diagram ID configured to identify a target diagram, the comment (additional content) created by the user in the comment adding operation, and a code block ID (position information) configured to identify a code block corresponding to a line number designated by the user in the comment adding operation (a code block including codes described in the line number). When there is no code block corresponding to the line number designated by the user, a function ID configured to identify a function corresponding to the line number may be included in the diagram additional information. The diagram additional information generated in Step S14 is stored in the diagram storage 12.

When the processing of Step S14 is executed, the diagram display processing module 14 reflects the diagram additional information stored in the diagram storage 12 to the target diagram displayed in the diagram display area 202 (Step S15). According to the above-described diagram additional information, the comment is displayed (added) to a sub-symbol representing a code block corresponding to the line number designated by the user by executing the processing of Step S15. As described above, when the function ID is included in the diagram additional information as the position information, the comment may be added to (a main symbol constituting) a function symbol representing a function identified by the function ID.

According to the above-described comment addition process, for example, when a comment has been added to the target source code, the same comment can be displayed in a relevant portion of the target diagram.

If it is determined in Step S11 that the comment adding operation has not been received (NO in Step S11), the comment addition process is ended.

Hereinafter, the above-described comment addition process will be specifically described. Here, it is assumed that the target source code (the part in which the main function is described) is displayed in the code display area 201, and the target diagram (the function symbol 400 representing the main function) is displayed in the diagram display area 202 as illustrated in FIG. 12.

In this case, for example, it is assumed that a comment is added to line 8 of the target source code. In this case, the user uses the input device 106 (for example, a mouse or a keyboard) to position the cursor on, for example, line 8 of the target source code and perform a right click operation. Incidentally, this operation corresponds to the above-described operation of designating the line number to which the comment needs to be added.

Here, when the right click operation has been performed after positioning the cursor on line 8 of the target source code as described above, a screen image illustrated in FIG. 18 (hereinafter referred to as a comment creating screen image) is displayed in a pop-up form or the like.

Figure 18:
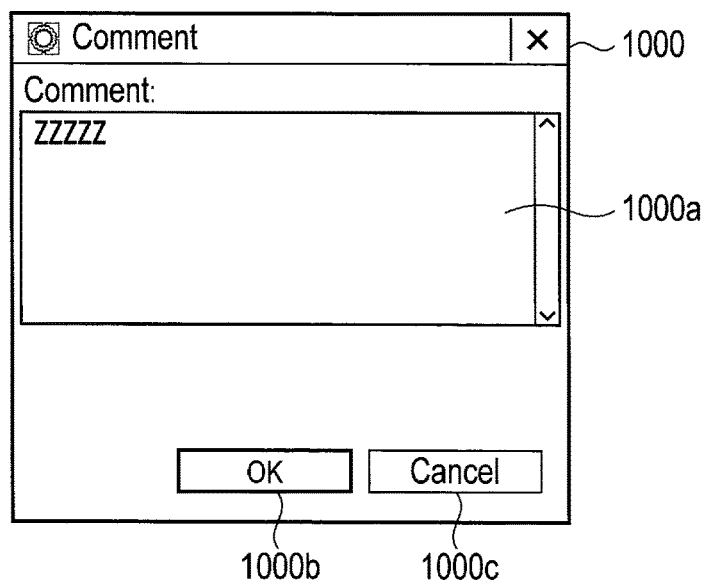
FIG. 18 is a view illustrating an example of a comment creating screen image.

As illustrated in FIG. 18, a comment creating area 1000a is provided in a comment creating screen image 1000. The user can create a comment in the comment creating area 1000a using the input device 106.

In addition, an "OK" button 1000b and a "cancel" button 1000c are further provided in the comment creating screen image 1000.

When the comment has been created in the comment creating area 1000a, and the "OK" button 1000b has been pressed by the user, the creation of the comment is completed.

On the other hand, when the "cancel" button 1000c has been pressed by the user, the creation of the comment is canceled.

Figure 17:
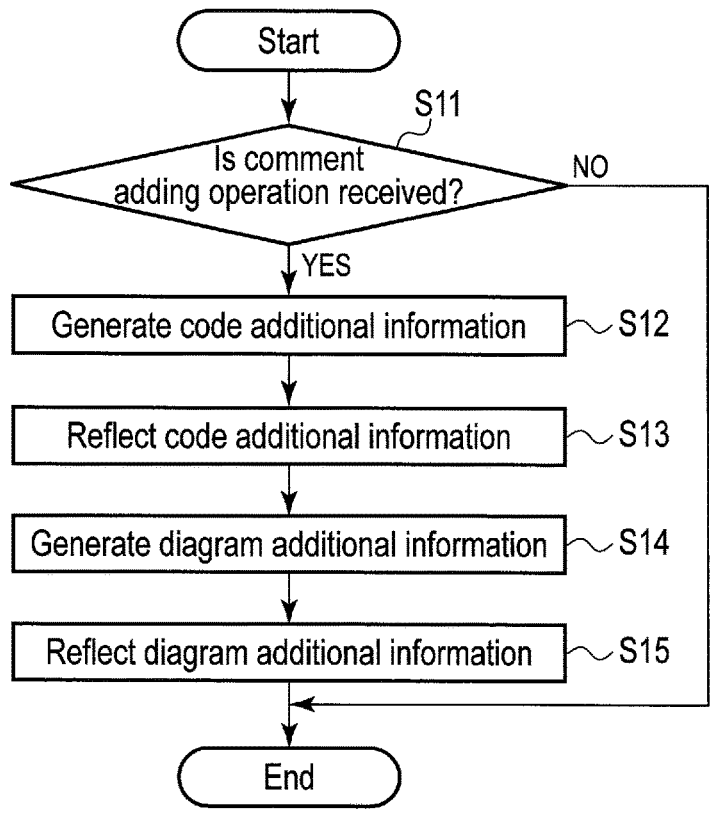
FIG. 17 is a flowchart illustrating an example of a processing procedure of a comment addition process.

When the creation of the comment on the comment creating screen image 1000 is completed as described above, the processing of Steps S12 to S15 illustrated in FIG. 17 is executed. In Step S12 in this case, code additional information including a source code ID configured to identify a target source code, the comment (additional content) created by the user on the comment creating screen image 1000, and "line 8" (position information) designated by the user in the code display area 201 is generated.

In Step S13, the comment additional information generated in Step S12 is reflected to the target source code displayed in the code display area 201.

In Step S14, diagram additional information including a diagram ID configured to identify a target diagram, the comment (additional content) created by the user on the comment creating screen image 1000, and a code block ID (position information) configured to identify a code block corresponding to a line number designated by the user in the code display area 201 is generated.

In Step S15, the diagram additional information generated in Step S14 is reflected to the target diagram displayed in the diagram display area 202.

Here, FIG. 19 illustrates an example of the display screen image 200 after the above-described processing of Steps S12 to S15 has been executed.

As illustrated in FIG. 19, the comment created by the user is added to line 8 of the target source code displayed in the code display area 201.

In addition, the comment created by the user is added to the sub-symbol 400*b* included in the main function symbol 400 included in the target diagram displayed in the diagram display area 202.

When a comment is added to a position (line) designated by the user of the target source code in the code display area 201 as described above, the same comment is also added to the corresponding portion of the target diagram.

Although the description has been given assuming that a comment is reflected to the target diagram when the comment is added to the target source code in the present embodiment, it is also possible for the user to add a comment to the target diagram, for example. In this case, the comment added to the target diagram is reflected to the target source code.

Incidentally, the comment with respect to the target diagram can be added to, for example, the main symbol or sub-symbol constituting the target diagram. Accordingly, for example, when the comment is added to the main symbol constituting the target diagram, it suffices that the comment is displayed (added) to an arbitrary line or the like where a function represented by the main symbol (function symbol) is described in the target source code. On the other hand, for example, when the comment is added to the sub-symbol constituting the target diagram, it suffices that the comment is displayed (added) to an arbitrary line or the like where the code block represented by the sub-symbol is described in the target source code.

In addition, the case where the comment is added has been described in the present embodiment, but it is also possible to delete the comment. When the comment is deleted, it suffices that the additional information (code additional information and diagram additional information) including the comment as the additional content is deleted, and the deletion of the additional information is reflected to the target source code and the target diagram.

Next, an example of a processing procedure of the highlight display change process will be described with reference to a flowchart of FIG. 20. Incidentally, the highlight display change process according to the present embodiment means a process of editing (generating, deleting, and the like) additional information (code additional information and diagram additional information) including highlight as an additional content.

Here, it is assumed that a target source code is displayed in the code display area 201, and a target diagram to which a function (function symbol) designated by a user has been added is displayed in the diagram display area 202 by executing the above-described diagram display process.

Here, for example, the user can change presence or absence of highlight display on the target source code displayed in the code display area 201. The presence or absence of highlight display can be changed, for example, in units of code blocks constituting a function.

When a function designated by the user is added to the target diagram, a part of the target source code where the function is described and a function symbol representing the function included in the target diagram are highlighted and displayed as described in the diagram display process illustrated in FIG. 8 and the like. Thus, the case of releasing the highlight display of (the highlighted and displayed part of) the target source code will be mainly described.

When releasing the highlight display of the target source code as described above, the user displays the highlighted and displayed part of the target source code in the code display area 201 and performs an operation of releasing the highlight display (hereinafter referred to as a highlight releasing operation). The user can release the highlight display with respect to the target source code by performing this highlight releasing operation. Incidentally, the highlight releasing operation includes an operation of designating a code block (line number where the code block is described) for which highlight display is to be released.

The operation receiving module 15 determines whether the above-described highlight releasing operation has been received (that is, performed by the user) (Step S21).

When it is determined that the highlight releasing operation has been received (YES in Step S21), the editing processing module 16 deletes code additional information to be added to the target source code (Step S22). In this case, the editing processing module 16 deletes the code additional information including a source code ID configured to identify a target source code, an additional content "highlight", and a line number (position information) in which the code block designated by the user in the highlight releasing operation is described, from the code storage 11.

When the processing of Step S22 is executed, the code display processing module 13 reflects the deletion of the code additional information in Step S22 to the target source code displayed in the code display area 201 (Step S23). According to the deletion of the code additional information described above, the highlight display of the part of the code block designated by the user in the target source code displayed in the code display area 201 is released by executing the processing of Step S23.

In addition, the editing processing module 16 deletes diagram additional information to be added to the target diagram displayed in the diagram display area 202 (Step S24). In this case, the editing processing module 16 deletes the diagram additional information including a diagram ID configured to identify a target diagram, an additional content "highlight", and a code block ID (position information) configured to identify a code block designated by the user in the highlight releasing operation, from the diagram storage 12. Incidentally, the code block ID configured to identify the code block designated by the user can be specified based on a line number in which the code block designated by the user is described and the above-described code analysis information (code block information) stored in the code storage 11.

When the processing of Step S24 is executed, the diagram display processing module 14 reflects the deletion of the diagram additional information in Step S24 to the target diagram displayed in the diagram display area 202 (Step S25). According to the deletion of the diagram additional information, the highlight display of the sub-symbol representing the code block designated by the user in the target diagram displayed in the diagram display area 202 is released by executing the processing of Step S25.

According to the above-described highlight display change process, for example, when the highlight display of the target source code (code block) is released (the presence or absence of highlight display is changed), the highlight display of the corresponding portion (sub-symbol representing the code block) of the target diagram can be also released in the same manner (the presence or absence of highlight display can be changed).

When it is determined that the highlight releasing operation has not been received in Step S21 (NO in Step S21), the highlight display change process is ended.

Hereinafter, the highlight display change process will be described in detail. Here, it is assumed that the target source code (the part in which the main function is described) is displayed in the code display area 201, and the target diagram (the function symbol 400 representing the main function) is displayed in the diagram display area 202 as illustrated in FIG. 12.

In this case, for example, it is assumed that the highlight display of the code block described in lines 8 to 10 of the target source code is canceled. In this case, the user performs an operation of designating lines 8 to 10 of the target source code using the input device 106 (for example, a mouse or a keyboard).

In this case, the processing of Steps S22 to S23 illustrated in FIG. 20 is executed. In Step S22 in this case, code additional information including a source code ID configured to identify a target source code, an additional content "highlight", and "(line) 8 to (line) 10" (position information) selected (designated) by the user is deleted from the code storage 11.

Specifically, code additional information including a source code ID configured to identify a target source code, an additional content "highlight", and position information "(line) 5 to (line) 13" is stored in the code storage 11 before the processing of Step S22 is executed. Thus, when the above-described code additional information is deleted from the code storage 11, a state is formed where code additional information including a source code ID configured to identify a target source code, an additional content "highlight", and position information "(line) 5 to (line) 7" and code additional information including a source code ID configured to identify a target source code, an additional content "highlight", and position information "(line) 11 to (line) 13" are stored in the code storage 11.

In Step S23, the deletion of the comment additional information in Step S22 is reflected to the target source code displayed in the code display area 201.

In Step S24, diagram additional information including a diagram ID configured to identify a target diagram, an additional content "highlight", and a code block ID (position information) configured to identify the code block described in lines 8 to 10 selected by the user is deleted from the diagram storage 12.

In Step S25, the deletion of the diagram additional information in Step S24 is reflected to the target diagram displayed in the diagram display area 202.

Figure 21:
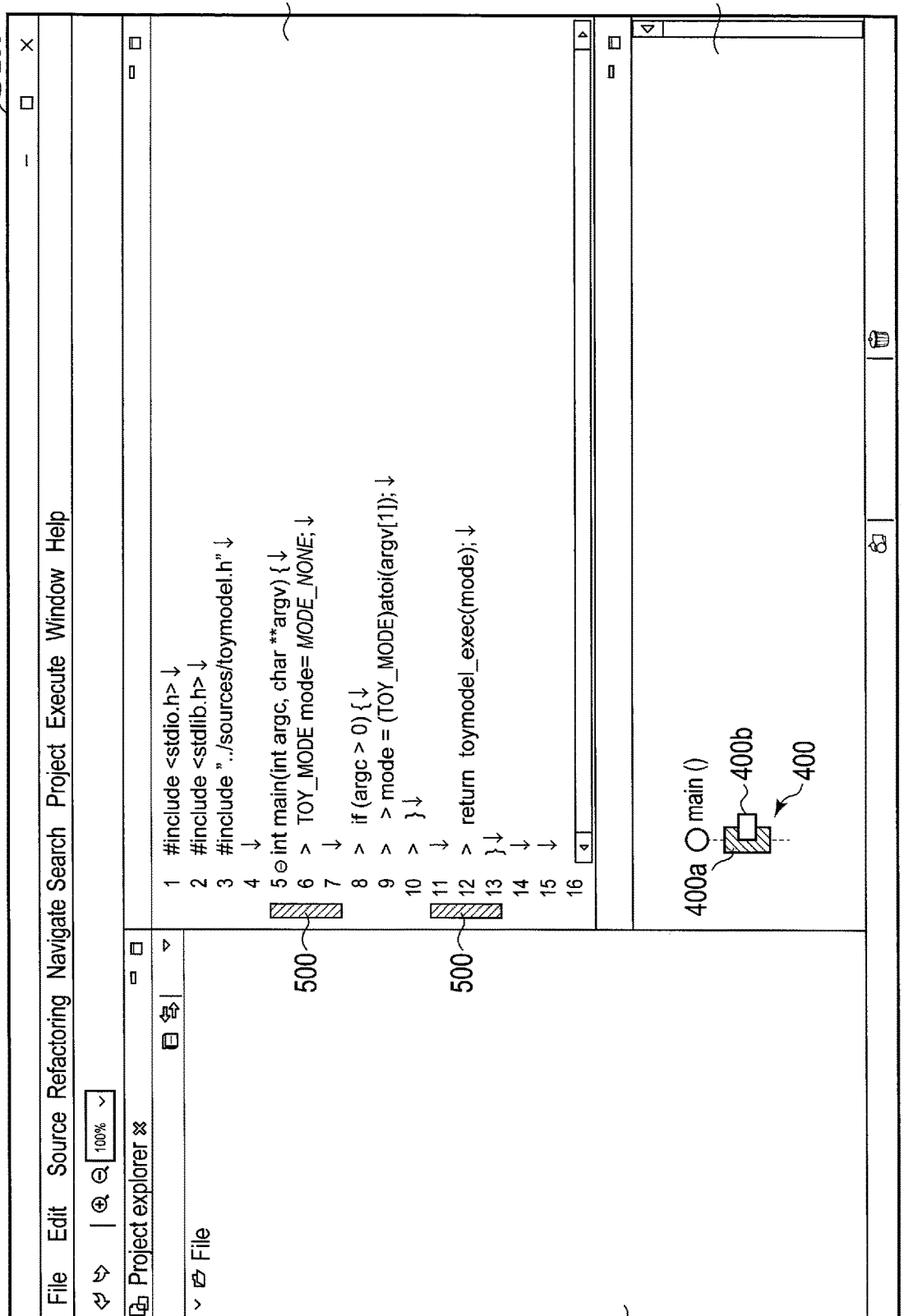
FIG. 21 is a view for specifically describing the highlight display change process.

Here, FIG. 21 illustrates an example of the display screen image 200 after the above-described processing of Steps S22 to S25 has been executed.

As illustrated in FIG. 21, the highlight display line 500 indicating the state of being highlighted and displayed has been deleted (that is, the highlight display has been released) in lines 8 to 10 of the target source code displayed in the code display area 201.

In addition, the sub-symbol 400b included in the main function symbol 400 included in the target diagram displayed in the diagram display area 202 is not added with a color indicating the state of being highlighted and displayed (that is, the highlight display has been released).

As described above, when the highlight display of the position designated (selected) by the user in the target source code has been released in the present embodiment, the highlight display of the corresponding portion of the target diagram is similarly released.

Although the case where the highlight display of lines 8 to 10 of the target source code is canceled has been described here for the sake of convenience, generally, highlight display or the like of a portion which does not operate in a predetermined behavior is released in response to an operation of the user.

Although the case where the highlight display is released has mainly been described in the present embodiment, it may be configured such that setting of highlight display is reflected to the target diagram for example, when the highlight display is set for the target source code. In this case, it suffices that additional information (code additional information and diagram additional information) including the highlight display as an additional content is generated, and the additional information is reflected to the target source code and the target diagram.

In addition, the description has been given assuming that the change in the presence or absence of the highlight display is reflected to the target diagram when the presence or absence of highlight display with respect to the target source code is changed in the present embodiment, but it may be configured such that a change in presence or absence of highlight display is reflected to the target source code, for example, when the presence or absence of highlight display with respect to the target diagram is changed.

As described above, the screen image where the code display area 201 (first display area) displaying the source code and the diagram display area 202 (second display area) displaying the diagram representing at least a part of the source code are arranged is displayed, and the diagram displayed in the diagram display area 202 is edited (created) in the present embodiment. In the present embodiment, it is possible to add the function (function symbol representing), designated by the user among the plurality of functions included in the source code displayed in the code display area 201, to the diagram.

In a general tool that supports code reading, it is difficult to reflect an intention of a user, for example, because an element that the user (developer) does not want to illustrate is displayed. In the present embodiment, however, it is possible to create and display the diagram intended by the user with the above-described configuration, and thus, it is possible to appropriately support the code reading.

In the present embodiment, a part of the source code displayed in the code display area 201 where the function designated by the user is described is highlighted and displayed. With such a configuration, the user can easily distinguish the function which has been added to the diagram among the plurality of functions included in the source code.

In the present embodiment, the above-described function symbol includes the sub-symbol representing the code block constituting the function designated by the user. In addition, the position of the sub-symbol included in the function symbol is set based on the position of the code block represented by the sub-symbol described in the function represented by the function symbol. With such a configuration, the user can easily grasp a positional relationship and the like of the code blocks constituting the function designated by the user in the diagram.

In the present embodiment, for example, a first function symbol representing a first function is added to the diagram when the first function is designated, and a second function symbol representing a second function is added to the diagram when the second function included in the first function is designated. In addition, a part of the source code in which the second function is described is displayed in the code display area 201 when the second function is designated. With such a configuration, it is possible to sequentially designate the functions (that is, the called functions) described in the respective functions in the code display area 201 in the present embodiment.

In addition, the diagram represents the calling relationship between the first function and the second function in the present embodiment. Specifically, the calling relationship between the first function and the second function can be represented by a calling line (arrow) connecting the first function symbol and the second function symbol. With such a configuration, the user can easily grasp the calling relationship between the plurality of functions in the diagram in the present embodiment. In the present embodiment, the calling line representing the calling relationship between the first function and the second function connects a sub-symbol representing a code block in which the second function is described among code blocks constituting the first function and the second function symbol. According to such a configuration, it is possible to easily grasp the position (code block) where the second function is described in the first function in the diagram.

Incidentally, only a part of the source code is displayed in the code display area 201 in the present embodiment, but when the function added to the diagram is displayed in the code display area 201, the diagram includes the indicator indicating the function symbol representing the function. According to such an indicator, it is possible to easily grasp the portion (function symbol and the like) of the diagram corresponding to the content displayed in the code display area 201.

In addition, the area 204 displaying the diagram as a whole may be further arranged in the display screen image 200 in the present embodiment. In this case, for example, a part of the diagram designated by the user is enlarged and displayed in the diagram display area 202. With such a configuration, details of the diagram can be easily confirmed.

Further, in the present embodiment, when a comment with respect to the source code displayed in the code display area 201 is created, the comment is also reflected to the diagram displayed in the diagram display area 202. Similarly, when a comment with respect to the diagram displayed in the diagram display area 202 is created, the comment is also reflected to the source code displayed in the code display area 201. With such a configuration, it is possible to confirm the comment on both the source code and the diagram, for example, even if the comment is added to one of the source code and the diagram, in the present embodiment In addition, in the present embodiment, when the presence or absence of highlight display with respect to the source code displayed in the code display area 201 is changed, the change in the presence or absence of the highlight display is also reflected to the diagram displayed in the diagram display area 202. Similarly, when the presence or absence of highlight display on the diagram displayed in the diagram display area 202 is changed, the change in the presence or absence of the highlight display is also reflected to the source code displayed in the code display area 201. With such a configuration, it is possible to confirm the changed content on both the source code and the diagram, for example, even if the presence or absence of highlight display is changed in one of the source code and the diagram, in the present embodiment.

That is, in the present embodiment, the convenience of the user can be improved by cooperatively operating the function as the viewer (editor) of the source code and the function as the editor of the diagram.

Incidentally, the above-described code reading support device 10 according to the present embodiment can be used, for example, when operating and maintaining software called a legacy code whose specification is unknown. Specifically, understanding (code reading) contents of such software (source codes) is often difficult, but it is possible to alleviate the difficulty of the code reading by using the code reading device 10 according to the present embodiment to refer to a diagram reflecting a user's intention and confirm a specific operation (behavior).

Although the description has been given assuming that the code reading support device 10 includes the code storage 11 and the diagram storage 12 in the present embodiment, at least a part of (the code analysis information and the code additional information stored in) the code storage 11 and (the diagram information and the diagram additional information stores in) the diagram storage 12 may be managed by an external device different from the code reading support device 10. In such a configuration, the information stored in the code storage 11 or the diagram storage 12 may be received from the external device as necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic calculator, comprising:
a diagram memory storing generated diagram information; and
a processor configured to
display a screen image on which a first area displaying source code and a second area displaying a diagram representing at least a part of the source code are arranged, the source code comprising a first function, and the first function in the source code comprises a second function,
display, in the first area, a first portion of the source code, the first portion including at least part of the first function;
receive, out of the first portion of displayed source code, selection by a user of only the first function;
in response to selection of the first function:
automatically generate first diagram information including a first identification to identify the first function, and store the first diagram information into the diagram memory, wherein the diagram memory stores generated diagram information only for user-selected functions; and automatically display, in the second area, a first diagram including a first function symbol representing the first function, based on the stored generated first diagram information;

display, in the first area, a part of the source code corresponding to the second function;

receive a selection, by the user, of the second function;

in response to selection of the second function:

automatically generate second diagram information including calling relationships, wherein the second diagram information includes the first identification of the first function as a calling function and a second identification to identify the second function as the called function, and store the second diagram information into the diagram memory; and automatically display, in the second area, a second diagram including all selected functions that have generated diagram information stored in the diagram memory, including the first function symbol representing the first function as the calling function and a second function symbol representing the second function as the called function, wherein the second function symbol is displayed at a position not overlapping the first function symbol, and is connected to the first function symbol by a calling line in the second diagram based on the calling relationship stored in the second diagram information.

2. The electronic calculator according to claim 1, wherein the source code comprises a plurality of functions, and the processor is further configured to selectively add a function symbol representing a function designated by the user using the electronic calculator, among the functions in the source code displayed in the first area, to the diagram displayed in the second area.

3. The electronic calculator according to claim 2, wherein a part of the source code displayed in the first area where the function designated by the user is described is highlighted and displayed.

4. The electronic calculator according to claim 2, wherein each of the functions is constituted by at least a code block, and the function symbol comprises a sub-symbol representing a code block constituting the function designated by the user.

5. The electronic calculator according to claim 4, wherein a position of the sub-symbol in the function symbol is set based on a position of the code block represented by the sub-symbol described in the function represented by the function symbol.

6. The electronic calculator according to claim 1, wherein the first function is constituted by at least a code block, the first function symbol comprises a sub-symbol representing the code block constituting the first function, and a calling relationship between the first function and the second function is represented by the calling line connecting the sub-symbol representing a code block in which the second function is described out of the code block constituting the first function and the second function symbol.

7. The electronic calculator according to claim 2, wherein a part of the source code is displayed in the first area, and when a function in the source code is displayed in the first area, the diagram comprises an indicator indicating a function symbol representing the function added to the diagram.

8. The electronic calculator according to claim 1, wherein a third area displaying the diagram as a whole is further arranged on the screen image, and a part of the diagram is enlarged and displayed in the second area.

9. The electronic calculator according to claim 1, wherein the processor is further configured to add, when a comment with respect to the source code displayed in the first area is created, the comment to the diagram displayed in the second area.

10. The electronic calculator according to claim 1, wherein the processor is further configured to add, when a comment with respect to the diagram displayed in the second area is created, the comment to the source code displayed in the first area.

11. The electronic calculator according to claim 1, wherein the processor is further configured to reflect, when presence or absence of a highlight display with respect to the source code displayed in the first area is changed, the change in the presence or absence of the highlight display on the diagram displayed in the second area.

12. The electronic calculator according to claim 1, wherein the processor is further configured to reflect, when presence or absence of a highlight display with respect to the diagram displayed in the second area is changed, the change in the presence or absence of the highlight display on the source code displayed in the first area.

13. The electronic calculator of claim 1, wherein the processor is further configured to generate and display, at a given time, diagrams having function symbols corresponding only to all of the functions in the source code selected by the user up to and including the given time, so that a set of connected function symbols corresponding to all of the functions selected by the user up to and including the given time is displayed on a same screen at a same time.

14. A method executed by an electronic calculator, the method comprising:

displaying a screen image on which a first area displaying source code and a second area displaying a diagram representing at least a part of the source code are arranged, the source code comprising a first function, and the first function in the source code comprises a second function;

displaying, in the first area, a first portion of the source code, the first portion including at least part of the first function;

receiving, out of the first portion of displayed source code, selection by a user of only the first function;

in response to selection of the first function, automatically generating first diagram information including a first identification to identify the first function, and store the first diagram information into a diagram memory, wherein the diagram memory stores generated diagram information only for user-selected functions, and automatically displaying, in the second area, a first diagram including a first function symbol representing the first function, based on the stored first diagram information;

displaying, in the first area, a part of the source code corresponding to the second function;

receiving a selection, by the user, of the second function;

in response to selection of the second function, automatically generating second diagram information including calling relationships, wherein the second diagram includes the first identification of the first function as a calling function and a second identification to identify the second function as the called function, and store the second diagram information into the diagram memory, and automatically displaying, in the second area, a second diagram including all selected functions that have generated diagram information stored in the diagram memory, including the first function symbol representing the first function as the calling function and a second function symbol representing the second function as the called function, wherein the second function symbol is displayed at a position not overlapping the first function symbol, and is connected to the first function symbol by a calling line in the second diagram based on the calling relationship stored in the second diagram information.

15. A non-transitory computer-readable storage medium having stored thereon a program executed by a computer of an electronic calculator, the program comprising instructions configured to cause the computer to execute a method comprising:

displaying a screen image on which a first area displaying source code and a second area displaying a diagram representing at least a part of the source code are arranged, the source code comprising a first function, and the first function in the source code comprises a second function;

displaying, in the first area, a first portion of the source code, the first portion including at least part of the first function;

receiving, out of the first portion of displayed source code, selection by a user of only the first function;

in response to selection of the first function, automatically generating first diagram information including a first identification to identify the first function, and store the first diagram information into a diagram memory, wherein the diagram memory stores generated diagram information only for user-selected functions, and automatically displaying, in the second area, a first diagram including a first function symbol representing the first function, based on the stored first diagram information;

displaying, in the first area, a part of the source code corresponding to the second function;

receiving, a selection, by the user, of the second function;

in response to selection of the second function in the source code, automatically generating second diagram information including calling relationships, wherein the second diagram includes the first identification of the first function as a calling function and a second identification to identify the second function as the called function, and store the second diagram information into the diagram memory, and automatically displaying, in the second area, a second diagram including all selected functions that have generated diagram information stored in the diagram memory, including the first function symbol representing the first function as the calling function and a second function symbol representing the second function as the called function, wherein the second function symbol is displayed at a position not overlapping the first function symbol, and is connected to the first function symbol by a calling line in the second diagram based on the calling relationship stored in the second diagram information.

\* \* \* \* \*